(12) United States Patent
Gao

(10) Patent No.: US 11,558,151 B2
(45) Date of Patent: Jan. 17, 2023

(54) FEEDBACK INFORMATION TRANSMISSION METHOD AND DEVICE, USER EQUIPMENT, BASE STATION AND STORAGE MEDIUM

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 163 days.

(21) Appl. No.: 16/645,633

(22) PCT Filed: Aug. 28, 2018

(86) PCT No.: PCT/CN2018/102682
§ 371 (c)(1),
(2) Date: Mar. 9, 2020

(87) PCT Pub. No.: WO2019/047743
PCT Pub. Date: Mar. 14, 2019

(65) Prior Publication Data
US 2020/0280397 A1   Sep. 3, 2020

(30) Foreign Application Priority Data
Sep. 8, 2017   (CN) .................. 201710806257.X

(51) Int. Cl.
*H04L 1/18*     (2006.01)
*H04W 76/28*    (2018.01)
*H04L 5/00*     (2006.01)

(52) U.S. Cl.
CPC .......... *H04L 1/1819* (2013.01); *H04L 1/1854* (2013.01); *H04L 5/0055* (2013.01);
(Continued)

(58) Field of Classification Search
None
See application file for complete search history.

(56) References Cited

U.S. PATENT DOCUMENTS

2011/0194443 A1   8/2011   Li et al.
2014/0105076 A1   4/2014   Yang et al.
(Continued)

FOREIGN PATENT DOCUMENTS

CN   102123019 A   7/2011
CN   102904698 A   1/2013
(Continued)

OTHER PUBLICATIONS

Chinese Office Action dated Oct. 10, 2020 for Chinese Application No. 201710806257.X.
(Continued)

*Primary Examiner* — Saumit Shah
(74) *Attorney, Agent, or Firm* — Harness, Dickey & Pierce, P.L.C.

(57) ABSTRACT

A feedback information transmission method, a feedback information transmission device, a UE, a base station and a computer-readable storage medium are provided. The feedback information transmission method includes: receiving configuration information from a base station, and determining the quantity of beam groups based on the configuration information; determining the quantity of bits of an HARQ-ACK based on the quantity of the beam groups; and generating an HARQ-ACK sequence corresponding to the quantity of the bits and transmitting the HARQ-ACK sequence to the base station.

20 Claims, 3 Drawing Sheets

(52) U.S. Cl.
CPC .......... *H04L 5/0092* (2013.01); *H04L 5/0098* (2013.01); *H04W 76/28* (2018.02)

(56) References Cited

U.S. PATENT DOCUMENTS

| | | | |
|---|---|---|---|
| 2015/0195062 A1 | 7/2015 | Hwang et al. | |
| 2015/0222394 A1 | 8/2015 | Cheng et al. | |
| 2018/0019842 A1 | 1/2018 | Fu et al. | |
| 2018/0242286 A1* | 8/2018 | Song | H04L 1/0072 |
| 2019/0090258 A1* | 3/2019 | Ryu | H04L 5/0053 |
| 2019/0386785 A1 | 12/2019 | Zhou | |
| 2021/0084640 A1* | 3/2021 | Kang | H04B 7/0695 |

FOREIGN PATENT DOCUMENTS

| | | |
|---|---|---|
| CN | 106160983 A | 11/2016 |
| CN | 106301702 A | 1/2017 |
| CN | 106712912 A | 5/2017 |
| CN | 106899391 A | 6/2017 |
| CN | 107113122 A | 8/2017 |
| WO | WO-2016/162791 A1 | 10/2016 |
| WO | WO-2017/030489 A1 | 2/2017 |
| WO | WO-2017/099831 A1 | 6/2017 |

OTHER PUBLICATIONS

Extended European Search Report dated Sep. 29, 2020 for EP Application No. 18854260.9.
International Preliminary Report on Patentability including Written Opinion and International Search Report dated Mar. 19, 2020 in International Application No. PCT/CN2018/102682.
Office Action dated Feb. 3, 2020 in Chinese Application No. 201710806257.
Samsung, "DCI Contents for NR", 3GPP TSG RAN WG1 20170519 Metting #89 R1-1707995, May 15-19, 2017, Hangzhou, China.

* cited by examiner

FEEDBACK INFORMATION TRANSMISSION METHOD AND DEVICE, USER EQUIPMENT, BASE STATION AND STORAGE MEDIUM

CROSS-REFERENCE TO RELATED APPLICATION

The present application is the U.S. national phase of PCT Application No. PCT/CN2018/102682 filed on Aug. 28, 2018, which claims priority to Chinese patent application No. 201710806257.X filed on Sep. 8, 2017, each of which are incorporated herein by reference in their entirety.

TECHNICAL FIELD

The present disclosure relates to the field of communication technology, in particular to a feedback information transmission method, a feedback information transmission device, a User Equipment (UE), a base station and a computer-readable storage medium.

BACKGROUND

Currently, in a Long Term Evolution (LTE) system, a UE is capable of merely receiving one Physical Downlink Shared Channel (PDSCH) in one serving cell within one subframe. For a Frequency Division Duplexing (FDD) system, a feedback sequence is n-4, i.e., the PDSCH received within a subframe n-4 may be subjected to Acknowledgement/Non-Acknowledgement (ACK/NACK) feedback within a subframe n. For a Time Division Duplexing (TDD) system, different feedback sequences are provided for different TDD uplink/downlink configurations. As shown in Table 1, the PDSCH received within a subframe n-k is subjected to ACK and/or NACK feedback within the subframe n, where a set K may include more than one element. At this time, it means that the PDSCHs received within a plurality of downlink subframes need to be subjected to the ACK and/or NACK feedback within a same uplink subframe n. The UE orders the ACKs and/or NACKs based on an order of scheduled downlink subframes, so as to acquire an ACK and/or NACK feedback information sequence including a plurality of bits. A same ordering rule is adopted by the UE and a base station, so when the ACK and/or NACK feedback information sequence is acquired, the base station may accurately determine an ACK and/or NACK feedback bit corresponding to the PDSCH within each scheduled subframe, so as to perform a retransmission operation accurately.

TABLE 1 downlink subframe index set K: $\{k_0, k_1, \ldots k_{M-1}\}$
corresponding to uplink subframes in the TDD system

| Uplink/downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

*annotation: K corresponding to each uplink subframe is given by taking one radio frame as an example, where n − k < 0 represents a downlink subframe of a previous radio frame.

However, along with the development of the mobile communication service, the International Telecommunication Union (ITU) and the $3^{rd}$ Generation Partnership Project (3GPP) have started to study a new radio communication system, e.g., a $5^{th}$-Generation New Radio Access Technique (5G NR) system. In the 5G NR system, the UE may receive two PDSCHs at the same time in one serving cell. The two PDSCHs may carry different Transport Blocks (TBs), and they may be derived from different Transmission Reception Points (TRPs). The PDSCHs from different TRPs may use different beams for transmission. The two PDSCHs need to correspond to the ACK and/or NACK feedback information, and the ACK/NACK feedback information corresponding to the two PDSCHs needs to be transmitted through a same uplink channel at a same time point. There is no relevant definition of this case in the LTE system.

In other words, there is currently no definite scheme about how to perform the ACK and/or NACK feedback on a plurality of PDSCHs received simultaneously in a same serving cell in the related art, so it is impossible to accurately feed back the ACKs and/or NACKs.

SUMMARY

An object of the present disclosure is to provide a feedback information transmission method, a feedback information transmission device, a UE, a base station and a computer-readable storage medium, so as to solve the problem in the related art where it is impossible to accurately perform the ACK and/or NACK feedback on a plurality of PDSCHs received simultaneously in a same serving cell.

In one aspect, the present disclosure provides in some embodiments a 1. A feedback information transmission method, including: receiving configuration information from a base station, and determining the quantity of beam groups based on the configuration information; determining the quantity of bits of Hybrid Automatic Repeat Request Acknowledgement (HARQ-ACK) based on the quantity of the beam groups; and generating an HARQ-ACK sequence corresponding to the quantity of the bits and transmitting the HARQ-ACK sequence to the base station.

In an embodiment of the present disclosure, the determining the quantity of the bits of the HARQ-ACK based on the quantity of the beam groups includes: determining a quantity of HARQ-ACK bits corresponding to each downlink time point which requires HARQ-ACK feedback at a current uplink time point, based on the quantity of the beam groups; and determining the quantity of the bits of the HARQ-ACK based on the quantity of the downlink time points which requires HARQ-ACK feedback at a current uplink time point, the quantity of the HARQ-ACK bits corresponding to each downlink time point, and the quantity of configured or activated serving cells and/or carriers and/or Bandwidth Parts (BWPs).

In an embodiment of the present disclosure, the determining the quantity of the HARQ-ACK bits corresponding to each downlink time point which requires HARQ-ACK feedback at a current uplink time point, based on the quantity of the beam groups includes: determining $$A = \sum_{i=0}^{K-1} C_i,$$

wherein A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission using a beam in a beam group i.

In an embodiment of the present disclosure, the determining $C_i$ corresponding to each downlink transmission using the beam in the beam group i includes: when a transmission mode is a multiple-TB transmission mode or when the transmission mode is the multiple-TB transmission mode without HARQ-ACK spatial bundling, determining that $C_i=Q$, wherein Q represents the quantity of TBs; or when the transmission mode is a single-TB transmission mode or the transmission mode is the multiple-TB transmission mode with HARQ-ACK spatial bundling, determining that $C_i=1$; or when Code Block Group (CBG)-based transmission has been configured and one TB is divided into P CBGs: if the transmission mode is the multiple-TB transmission mode or the transmission mode is the multiple-TB transmission mode without HARQ-ACK spatial bundling, determining that $C_i=Q\times P$, or if the transmission mode is the single-TB transmission mode or the transmission mode is the multiple-TB transmission mode with the HARQ-ACK spatial bundling, determining that $C_i=P$.

In an embodiment of the present disclosure, the determining the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of the configured or activated serving cells and/or carriers and/or BWPs includes: when M represents the quantity of the downlink time points which requires HARQ-ACK feedback at a current uplink time point, A represents the quantity of the HARQ-ACK bits corresponding to each downlink time point, and N represents the quantity of the configured or activated serving cells and/or carriers and/or BWPs, determining the quantity of the bits of the HARQ-ACK using the following equation: $X=M*A*N$, wherein X represents the quantity of the bits of the HARQ-ACK, $M\geq 1$ and $N\geq 1$; or $$X = \sum_{i=0}^{N-1} M_i \times A_i,$$

wherein X represents the quantity of the bits of the HARQ-ACK, $M\geq 1$, $N\geq 1$, $M_i$ represents a corresponding value of M on each configured or activated serving cell and/or carrier and/or BWP i, and $A_i$ represents a corresponding value of A on each configured or activated serving cell and/or carrier and/or BWP i.

In an embodiment of the present disclosure, the generating the HARQ-ACK sequence corresponding to the quantity of the bits includes: generating the HARQ-ACK sequence having A bits with respect to each downlink time point; and acquiring the HARQ-ACK sequence corresponding to the quantity of the bits based on the HARQ-ACK sequence having A bits with respect to each downlink time point.

In an embodiment of the present disclosure, the generating the HARQ-ACK sequence having A bits with respect to each downlink time point includes: generating a Non-Acknowledgement (NACK) and/or Discontinuous Transmission (DTX) as feedback information at a position in the HARQ-ACK sequence having A bits corresponding to a downlink time point where no downlink transmission has been received; and/or ordering the HARQ-ACKs for the downlink transmission using beams in different beam groups based on a pre-agreed or pre-configured order of the beam groups.

In an embodiment of the present disclosure, the ordering the HARQ-ACKs for the downlink transmission using the beams in different beam groups based on the pre-agreed or pre-configured order of the beam groups includes: ordering the HARQ-ACKs for the downlink transmission using the beams in different beam groups and received and received at a same downlink time point, in the HARQ-ACK sequences corresponding to the downlink time point, based on a descending order or an ascending order of numbers of the beam groups.

In an embodiment of the present disclosure, the acquiring the HARQ-ACK sequence corresponding to the quantity of the bits based on the HARQ-ACK sequence having A bits corresponding to each downlink time point, when HARQ-ACKs for the downlink transmissions at a plurality of downlink time points needs to be fed back at the same uplink time point, comprises at least one of the following: cascading the HARQ-ACK sequences having A bits corresponding to the downlink time points based on transmission times or based on values of a Downlink Allocation Index (DAI) counter corresponding to the downlink transmission, so as to acquire the HARQ-ACK sequence corresponding to the quantity of the bits; generating the NACK and/or DTX having A bits as the feedback information for a downlink time point where no downlink transmission has been received or a packet loss has been determined; when there is no Physical Downlink Shared Channel (PDSCH) corresponding to a Physical Downlink Control Channel (PDCCH) at one downlink time point, mapping the HARQ-ACK corresponding to the PDSCH to a predetermined position in the HARQ-ACK sequence corresponding to the quantity of the bits.

In an embodiment of the present disclosure, the acquiring the HARQ-ACK sequence corresponding to the quantity of the bits based on the HARQ-ACK sequence having A bits corresponding to each downlink time point, when the quantity N of the configured or activated serving cells and/or carriers and/or BWPs is greater than 1, comprises at least one of the following: acquiring the HARQ-ACK sequence corresponding to each configured or activated serving cell and/or carrier and/or BWP based on the HARQ-ACK sequence having A bits corresponding to each downlink time point, and cascading the HARQ-ACK sequences corresponding to the configured or activated serving cells and/or carriers and/or BWPs based on a predetermined order to acquire the HARQ-ACK sequence corresponding to the quantity of the bits; generating the NACK and/or DTX having the quantity of the HARQ-ACK bits corresponding to a serving cell and/or carrier and/or BWP as the feedback information for the serving cell and/or carrier and/or BWP where no downlink transmission has been received or where a packet loss has been determined.

In an embodiment of the present disclosure, the downlink transmission is one or more of a PDSCH, a PDCCH for scheduling the PDSCH, and a PDCCH indicating the release of a downlink Semi-Persistent Scheduling (SPS) resource.

In an embodiment of the present disclosure, the generating the HARQ-ACK sequence corresponding to the quantity of the bits and transmitting the HARQ-ACK sequence to the base station includes: generating the HARQ-ACK sequence corresponding to the quantity of the bits and transmitting the HARQ-ACK sequence to the base station through a Physical Uplink Control Channel (PUCCH) and/or a Physical Uplink Shared Channel (PUSCH).

In an embodiment of the present disclosure, each beam in the beam group is represented by any one of a Quasi Co-Location (QCL) relationship, a resource and/or a port for a reference signal related to beam measurement, a beam index, and a Beam Pair Linkage (BPL).

In another aspect, a feedback information transmission method, includes: determining the division of beams, and transmitting configuration information indicating the division of beams to a User Equipment (UE); determining the quantity of bits of HARQ-ACK based on the quantity of beam groups acquired from the division of beams; and receiving an HARQ-ACK sequence corresponding to the quantity of the bits from the UE.

In an embodiment of the present disclosure, the determining the quantity of the bits of the HARQ-ACK based on the quantity of the beam groups acquired from the division of beams includes: determining a quantity of HARQ-ACK bits corresponding to each downlink time point based on the quantity of the beam groups when the HARQ-ACK needs to be fed back at a current uplink time point; and determining the quantity of the bits of the HARQ-ACK based on the quantity of downlink time points when the HARQ-ACK needs to be fed back at the current time point, the quantity of the HARQ-ACK bits corresponding to each downlink time point, and the quantity of configured or activated serving cells and/or carriers and/or BWPs.

In an embodiment of the present disclosure, the determining the quantity of the HARQ-ACK bits corresponding to each downlink time point which requires HARQ-ACK feedback at a current uplink time point, based on the quantity of the beam groups includes: determining $$A = \sum_{i=0}^{K-1} C_i,$$

wherein A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission using a beam in a beam group i.

In an embodiment of the present disclosure, the determining $C_i$ corresponding to each downlink transmission using the beam in the beam group i includes: when a transmission mode is a multiple-TB transmission mode or when the transmission mode is the multiple-TB transmission mode without HARQ-ACK spatial bundling, determining that $C_i=Q$, wherein Q represents the quantity of TBs; or when the transmission mode is a single-TB transmission mode or the transmission mode is the multiple-TB transmission mode with HARQ-ACK spatial bundling, determining that $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, determining that $C_i=Q \times P$; or when the transmission mode is the single-TB transmission mode or the transmission mode is the multiple-TB transmission mode with the HARQ-ACK spatial bundling, determining that $C_i=P$.

In an embodiment of the present disclosure, the determining the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of the configured or activated serving cells and/or carriers and/or BWPs includes: determining the quantity of the bits of the HARQ-ACK using the equation X=M*A*N or $$X = \sum_{i=0}^{N-1} M_i \times A_i,$$

wherein X represents the quantity of the bits of the HARQ-ACK, M represents the quantity of the downlink time points when the HARQ-ACK is fed back at the current uplink time point, A represents the quantity of the HARQ-ACK bits corresponding to each downlink time point, N represents the quantity of the configured or activated serving cells and/or carriers and/or BWPs, M≥1, N≥1, $M_i$ represents a corresponding value of M on each configured or activated serving cell and/or carrier and/or BWP i, and $A_i$ represents a corresponding value of A on each configured or activated serving cell and/or carrier and/or BWP i.

In an embodiment of the present disclosure, the receiving the HARQ-ACK sequence corresponding to the quantity of the bits from the UE includes: determining that the HARQ-ACK sequence corresponding to the quantity of the bits is formed by the HARQ-ACK sequence having A bits corresponding to each downlink time point based on a predetermined rule, and acquiring the HARQ-ACK sequence having A bits corresponding to each downlink time point from the HARQ-ACK sequence corresponding to the quantity of the bits based on the predetermined rule.

In an embodiment of the present disclosure, the receiving the HARQ-ACK sequence corresponding to the quantity of the bits from the UE includes: determining an NACK and/or DTX generated by the UE at a position in the HARQ-ACK sequence having A bits where no downlink transmission has been received as feedback information; and/or determining that the HARQ-ACK having A bits corresponding to each downlink time point is acquired through ordering the HARQ-ACKs for the downlink transmission using beams in different beam groups based on a pre-agreed or pre-configured order of the beam groups, and acquiring the HARQ-ACKs for the downlink transmission using the beams in different beam groups at the downlink time point from the HARQ-ACK sequence having A bits based on a ordering mode.

In an embodiment of the present disclosure, the determining that the HARQ-ACK having A bits corresponding to each downlink time point is acquired through ordering the HARQ-ACKs for the downlink transmission using the beams in different beam groups based on the pre-agreed or pre-configured order of the beam groups includes: ordering the HARQ-ACKs for the downlink transmission using the beams in different beam groups and received at a same downlink time point in the HARQ-ACK sequences corresponding to the downlink time point based on a descending order or an ascending order of numbers of the beam groups.

In an embodiment of the present disclosure, the predetermined rule, when the HARQ-ACK needs to be fed back at the same uplink time point for the downlink transmission at a plurality of downlink time points, comprises at least one of the following: determining that the HARQ-ACK sequence corresponding to the quantity of the bits is acquired through cascading the HARQ-ACK sequences having A bits corresponding to the downlink time points based on transmission times or based on values of a DAI counter corresponding to the downlink transmission; determining that the NACK and/or DTX having A bits generated by the UE at a downlink time point where no downlink transmission has been received or a packet loss has been determined as the feedback information; when there is no PDSCH corresponding to a PDCCH at one downlink time point, determining that the HARQ-ACK corresponding to the PDSCH is mapped to a predetermined position in the HARQ-ACK sequence corresponding to the quantity of the bits.

In an embodiment of the present disclosure, the predetermined rule, when the quantity N of the configured or activated serving cells and/or carriers and/or BWPs is greater than 1, comprises at least one of the following: determining that the HARQ-ACK sequence corresponding to the quantity of the bits is acquired through cascading the HARQ-ACK sequences corresponding to the configured or activated serving cells and/or carriers and/or BWPs based on the HARQ-ACK sequence having A bits corresponding to each downlink time point, cascading the HARQ-ACK sequences corresponding to the configured or activated serving cells and/or carriers and/or BWPs based on a predetermined order, the HARQ-ACK sequence corresponding to each configured or activated serving cell and/or carrier and/or BWP being acquired based on the HARQ-ACK sequence having A bits corresponding to each downlink time point; determining the NACK and/or DTX for the quantity of the HARQ-ACK bits corresponding to each serving cell and/or carrier and/or BWP where no downlink transmission has been received by the UE or where a packet loss has been determined by the UE as the feedback information.

In an embodiment of the present disclosure, the downlink transmission is one or more of the PDSCH, a PDCCH for scheduling the PDSCH, and a PDCCH indicating the release of a downlink SPS resource.

In an embodiment of the present disclosure, the receiving the HARQ-ACK sequence corresponding to the quantity of the bits from the UE comprises receiving the HARQ-ACK sequence corresponding to the quantity of the bits from the UE through a PUCCH and/or a PUSCH.

In an embodiment of the present disclosure, each beam in the beam group is represented by any one of a QCL relationship, a resource and/or a port for a reference signal related to beam measurement, a beam index, and a BPL.

In yet another aspect a UE, includes a memory, a processor, a transceiver, and a computer program stored in the memory and executed by the processor, wherein the processor is configured to execute the computer program, so as to: receive through the transceiver configuration information from a base station, and determine the quantity of beam groups based on the configuration information; determine the quantity of bits of HARQ-ACK based on the quantity of the beam groups; and generate an HARQ-ACK sequence corresponding to the quantity of the bits and transmit the HARQ-ACK sequence to the base station.

In an embodiment of the present disclosure, the processor is further configured to: determine a quantity of HARQ-ACK bits corresponding to each downlink time point based on the quantity of the beam groups when the HARQ-ACK needs to be fed back at a current uplink time point; and determine the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of configured or activated serving cells and/or carriers and/or BWPs.

In an embodiment of the present disclosure, the processor is further configured to: determine $$A = \sum_{i=0}^{K-1} C_i,$$

wherein A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission using a beam in a beam group i.

In an embodiment of the present disclosure, when determining $C_i$ corresponding to each downlink transmission using the beam in the beam group i, the processor is further configured to: when a transmission mode is a multiple-TB transmission mode or when the transmission mode is the multiple-TB transmission mode without HARQ-ACK spatial bundling, determine that $C_i=Q$, wherein Q represents the quantity of TBs; or when the transmission mode is a single-TB transmission mode or the transmission mode is the multiple-TB transmission mode with HARQ-ACK spatial bundling, determine that $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, determine that $C_i=Q \times P$; or when the transmission mode is the single-TB transmission mode or the transmission mode is the multiple-TB transmission mode with the HARQ-ACK spatial bundling, determine that $C_i=P$.

In an embodiment of the present disclosure, the processor is further configured to when M represents the quantity of the downlink time points when the HARQ-ACK is fed back at the current uplink time point, A represents the quantity of the HARQ-ACK bits corresponding to each downlink time point, and N represents the quantity of the configured or activated serving cells and/or carriers and/or BWPs, determine the quantity of the bits of the HARQ-ACK using the following equation: X=M*A*N, wherein X represents the quantity of the bits of the HARQ-ACK, M≥1 and N≥1; or $$X = \sum_{i=0}^{N-1} M_i \times A_i,$$

wherein X represents the quantity of the bits of the HARQ-ACK, M≥1, N≥1, $M_i$ represents a corresponding value of M on each configured or activated serving cell and/or carrier and/or BWP i, and $A_i$ represents a corresponding value of A on each configured or activated serving cell and/or carrier and/or BWP i. In an embodiment of the present disclosure, the processor is further configured to: generate the HARQ-ACK sequence having A bits with respect to each downlink time point; and acquire the HARQ-ACK sequence corresponding to the quantity of the bits based on the HARQ-ACK sequence having A bits with respect to each downlink time point.

In an embodiment of the present disclosure, the processor is further configured to: the processor is further configured to: generate an NACK and/or DTX as feedback information at a position in the HARQ-ACK sequence having A bits where no downlink transmission has been received; and/or order he HARQ-ACKs for the downlink transmission using beams in different beam groups based on a pre-agreed or pre-configured order of the beam groups.

In an embodiment of the present disclosure, the processor is further configured to order the HARQ-ACKs for the downlink transmission using the beams in different beam groups and received at a same downlink time point in the HARQ-ACK sequences corresponding to the downlink time point based on a descending order or an ascending order of numbers of the beam groups.

In an embodiment of the present disclosure, the processor is further configured to: when the HARQ-ACK needs to be fed back at the same uplink time point for the downlink transmission at a plurality of downlink time points, comprise at least one of the following: cascade the HARQ-ACK sequences having A bits corresponding to the downlink time points based on transmission times or based on values of a DAI counter corresponding to the downlink transmission, so as to acquire the HARQ-ACK sequence corresponding to the quantity of the bits; generate the NACK and/or DTX having A bits as the feedback information at a downlink time point where no downlink transmission has been received or a packet loss has been determined; when there is no PDSCH corresponding to a PDCCH at one downlink time point, map the HARQ-ACK corresponding to the PDSCH to a predetermined position in the HARQ-ACK sequence corresponding to the quantity of the bits.

In an embodiment of the present disclosure, the processor is further configured to, when the quantity N of the configured or activated serving cells and/or carriers and/or BWPs is greater than 1, comprise at least one of the following: acquire the HARQ-ACK sequence corresponding to each configured or activated serving cell and/or carrier and/or BWP based on the HARQ-ACK sequence having A bits corresponding to each downlink time point, and cascade the HARQ-ACK sequences corresponding to the configured or activated serving cells and/or carriers and/or BWPs based on a predetermined order to acquire the HARQ-ACK sequence corresponding to the quantity of the bits; generate the NACK and/or DTX having the quantity of the HARQ-ACK bits corresponding to a serving cell and/or carrier and/or BWP as the feedback information for the serving cell and/or carrier and/or BWP where no downlink transmission has been received or where a packet loss has been determined.

In an embodiment of the present disclosure, the downlink transmission is one or more of the PDSCH, a PDCCH for scheduling the PDSCH, and a PDCCH indicating the release of a downlink SPS resource.

In an embodiment of the present disclosure, the processor is further configured to generate the HARQ-ACK sequence corresponding to the quantity of the bits and transmit the HARQ-ACK sequence to the base station through a PUCCH and/or a PUSCH.

In an embodiment of the present disclosure, each beam in the beam group is represented by any one of a QCL relationship, a resource and/or a port for a reference signal related to beam measurement, a beam index, and a BPL.

In yet another aspect, a base station, includes a memory, a processor, a transceiver, and a computer program stored in the memory and executed by the processor, wherein the processor is configured to execute the computer program so as to: determine the division of beams, and transmit configuration information indicating the division of beams to a UE; determine the quantity of bits of HARQ-ACK based on the quantity of beam groups acquired from the division of beams; and receive an HARQ-ACK sequence corresponding to the quantity of the bits from the UE.

In an embodiment of the present disclosure, the processor is further configured to: determine a quantity of HARQ-ACK bits corresponding to each downlink time point based on the quantity of the beam groups when the HARQ-ACK needs to be fed back at a current uplink time point; and determine the quantity of the bits of the HARQ-ACK based on the quantity of downlink time points when the HARQ-ACK needs to be fed back at the current time point, the quantity of the HARQ-ACK bits corresponding to each downlink time point, and the quantity of configured or activated serving cells and/or carriers and/or BWPs.

In an embodiment of the present disclosure, the processor is further configured to: determine $$A = \sum_{i=0}^{K-1} C_i,$$

wherein A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission using a beam in a beam group i.

In an embodiment of the present disclosure, when determining $C_i$ corresponding to each downlink transmission using the beam in the beam group i, the processor is further configured to: when a transmission mode is a multiple-TB transmission mode or when the transmission mode is the multiple-TB transmission mode without HARQ-ACK spatial bundling, determine that $C_i=Q$, wherein Q represents the quantity of TBs; or when the transmission mode is a single-TB transmission mode or the transmission mode is the multiple-TB transmission mode with HARQ-ACK spatial bundling, determine that $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, determine that $C_i=Q \times P$; or when the transmission mode is the single-TB transmission mode or the transmission mode is the multiple-TB transmission mode with the HARQ-ACK spatial bundling, determine that $C_i=P$.

In an embodiment of the present disclosure, the processor is further configured to determine the quantity of the bits of the HARQ-ACK using the equation X=M*A*N or $$X = \sum_{i=0}^{N-1} M_i \times A_i,$$

wherein X represents the quantity of the bits of the HARQ-ACK, M represents the quantity of the downlink time points when the HARQ-ACK is fed back at the current uplink time point, A represents the quantity of the HARQ-ACK bits corresponding to each downlink time point, N represents the quantity of the configured or activated serving cells and/or carriers and/or BWPs, M≥1, N≥1, $M_i$ represents a corresponding value of M on each configured or activated serving cell and/or carrier and/or BWP i, and $A_i$ represents a corresponding value of A on each configured or activated serving cell and/or carrier and/or BWP i.

In an embodiment of the present disclosure, the processor is further configured to determine that the HARQ-ACK sequence corresponding to the quantity of the bits is formed by the HARQ-ACK sequence having A bits corresponding to each downlink time point based on a predetermined rule, and acquire the HARQ-ACK sequence having A bits corresponding to each downlink time point from the HARQ-ACK sequence corresponding to the quantity of the bits based on the predetermined rule.

In an embodiment of the present disclosure, the processor is further configured to: determine an NACK and/or DTX generated by the UE at a position in the HARQ-ACK sequence having A bits where no downlink transmission has been received as feedback information; and/or determine that the HARQ-ACK having A bits corresponding to each downlink time point is acquired through ordering the HARQ-ACKs for the downlink transmission using beams in different beam groups based on a pre-agreed or pre-configured order of the beam groups, and acquire the HARQ-ACKs for the downlink transmission using the beams in different beam groups at the downlink time point from the HARQ-ACK sequence having A bits based on a ordering mode.

In an embodiment of the present disclosure, the processor is further configured to order the HARQ-ACKs for the downlink transmission using the beams in different beam groups and received at a same downlink time point in the HARQ-ACK sequences corresponding to the downlink time point based on a descending order or an ascending order of numbers of the beam groups.

In an embodiment of the present disclosure, the predetermined rule, when the HARQ-ACK needs to be fed back at the same uplink time point for the downlink transmission at a plurality of downlink time points, comprises at least one of the following: determining that the HARQ-ACK sequence corresponding to the quantity of the bits is acquired through cascading the HARQ-ACK sequences having A bits corresponding to the downlink time points based on transmission times or based on values of a DAI counter corresponding to the downlink transmission; determining that the NACK and/or DTX having A bits generated by the UE at a downlink time point where no downlink transmission has been received or a packet loss has been determined as the feedback information; when there is no PDSCH corresponding to a PDCCH at one downlink time point, determining that the HARQ-ACK corresponding to the PDSCH is mapped to a predetermined position in the HARQ-ACK sequence corresponding to the quantity of the bits.

In an embodiment of the present disclosure, the predetermined rule, when the quantity N of the configured or activated serving cells and/or carriers and/or BWPs is greater than 1, comprises at least one of the following: determining that the HARQ-ACK sequence corresponding to the quantity of the bits is acquired through cascading the HARQ-ACK sequences corresponding to the configured or activated serving cells and/or carriers and/or BWPs based on the HARQ-ACK sequence having A bits corresponding to each downlink time point, cascading the HARQ-ACK sequences corresponding to the configured or activated serving cells and/or carriers and/or BWPs based on a predetermined order, the HARQ-ACK sequence corresponding to each configured or activated serving cell and/or carrier and/or BWP being acquired based on the HARQ-ACK sequence having A bits corresponding to each downlink time point; determining the NACK and/or DTX for the quantity of the HARQ-ACK bits corresponding to each serving cell and/or carrier and/or BWP where no downlink transmission has been received by the UE or where a packet loss has been determined by the UE as the feedback information.

In an embodiment of the present disclosure, the downlink transmission is one or more of the PDSCH, a PDCCH for scheduling the PDSCH, and a PDCCH indicating the release of a downlink SPS resource.

In an embodiment of the present disclosure, the processor is further configured to receive the HARQ-ACK sequence corresponding to the quantity of the bits from the UE through a PUCCH and/or a PUSCH.

In an embodiment of the present disclosure, each beam in the beam group is represented by any one of a QCL relationship, a resource and/or a port for a reference signal related to beam measurement, a beam index, and a BPL.

In still yet another aspect, a computer-readable storage medium storing therein a computer program, wherein the computer program is executed by a processor so as to implement the above feedback information transmission method.

In yet another aspect, a computer-readable storage medium storing therein a computer program, wherein the computer program is executed by a processor so as to implement the above feedback information transmission method.

In yet another aspect, a feedback information transmission device includes: a first processing module configured to receive configuration information from a base station, and determine the quantity of beam groups based on the configuration information; a first determination module configured to determine the quantity of bits of HARQ-ACK based on the quantity of the beam groups; and a second processing module configured to generate an HARQ-ACK sequence corresponding to the quantity of the bits and transmit the HARQ-ACK sequence to the base station.

In yet another aspect, a feedback information transmission device includes: a third processing module configured to determine the division of beams, and transmit configuration information indicating the division of beams to a UE; a third determination module configured to determine the quantity of bits of HARQ-ACK based on the quantity of beam groups acquired from the division of beams; and a first reception module configured to receive an HARQ-ACK sequence corresponding to the quantity of the bits from the UE.

The present disclosure has the following beneficial effect. According to the embodiments of the present disclosure, the configuration information may be received from the base station, and the quantity of the beam groups may be determined based on the configuration information. Next, the quantity of the bits of the HARQ-ACK may be determined based on the quantity of the beam groups. Then, the HARQ-ACK sequence corresponding to the quantity of the bits may be generated and transmitted to the base station. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently, thereby to solve the problem in the related art where it is impossible to accurately perform the ACK and/or NACK feedback on a plurality of PDSCHs received simultaneously in a same serving cell.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
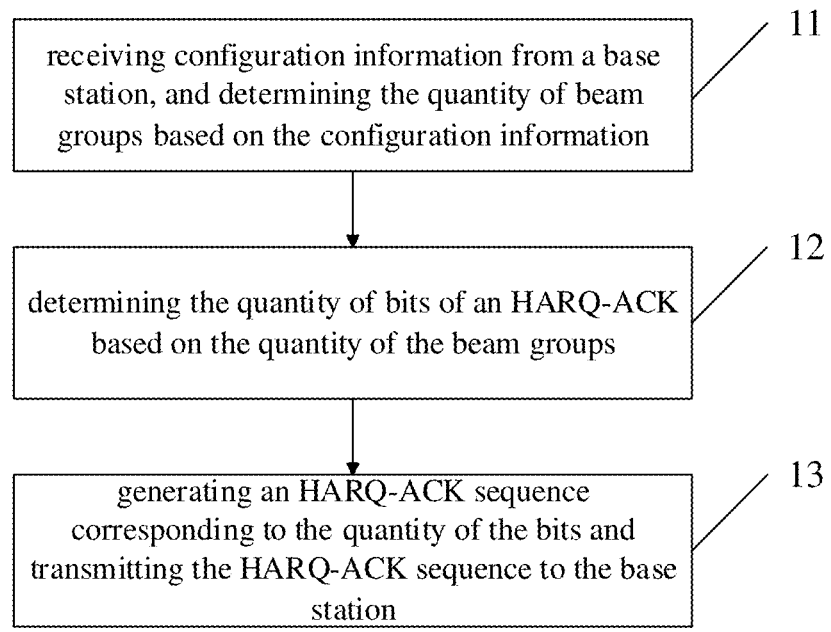
FIG. 1 is a flow chart of a feedback information transmission method according to one embodiment of the present disclosure.

In order to solve the problem in the related art where it is impossible to accurately perform the ACK and/or NACK feedback on a plurality of PDSCHs received simultaneously in a same serving cell, the present disclosure provides in some embodiments a feedback information transmission method applied for a UE which, as shown in FIG. 1, includes: Step 11 of receiving configuration information from a base station, and determining the quantity of beam groups based on the configuration information; Step 12 of determining the quantity of bits of an HARQ-ACK based on the quantity of the beam groups; and Step 13 of generating an HARQ-ACK sequence corresponding to the quantity of the bits and transmitting the HARQ-ACK sequence to the base station.

The HARQ-ACK is just feedback information for the downlink transmission, and it may include ACK or NACK, and may further include DTX. When the downlink transmission has been received accurately, the HARQ-ACK may be the ACK, and when the downlink transmission has not been received accurately or has been lost, the HARQ-ACK may be the NACK or DTX.

According to the embodiments of the present disclosure, the configuration information may be received from the base station, and the quantity of the beam groups may be determined based on the configuration information. Next, the quantity of the bits of the HARQ-ACK may be determined based on the quantity of the beam groups. Then, the HARQ-ACK sequence corresponding to the quantity of the bits may be generated and transmitted to the base station. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently, thereby to solve the problem in the related art where it is impossible to accurately perform the ACK and/or NACK feedback on a plurality of PDSCHs received simultaneously in a same serving cell.

The determining the quantity of the bits of the HARQ-ACK based on the quantity of the beam groups may include: determining the quantity of HARQ-ACK bits corresponding to each downlink time point based on the quantity of the beam groups when the HARQ-ACK needs to be fed back at a current uplink time point; and determining the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of configured or activated serving cells and/or carriers and/or BWPs.

In a possible embodiment of the present disclosure, the determining the quantity of the HARQ-ACK bits corresponding to each downlink time point which requires HARQ-ACK feedback at a current uplink time point, based on the quantity of the beam groups point may include determining $$A = \sum_{i=0}^{K-1} C_i,$$

where A represents the quantity of the HARQ-ACK bits corresponding to each downlink time point which requires HARQ-ACK feedback at a current uplink time point, K represents the quantity of the beam groups, and C represents the quantity of the HARQ-ACK bits corresponding to each downlink transmission when a beam in a beam group i is adopted.

It should be appreciated that, possibly different quantities of the beam groups may correspond to different downlink transmission modes, whether there is the HARQ-ACK spatial bundling, and different quantities of CBGs, so the determined $C_i$ may have different values. When $C_i$ has a same value, the above equation may be simplified as A=C*K, where K represents the quantity of the beam groups, and C represents the quantity of HARQ-ACK bits corresponding to each downlink transmission.

In a possible embodiment of the present disclosure, the determining $C_i$ corresponding to each downlink transmission when the beam in the beam group i is adopted may include: when a transmission mode is a multiple-TB transmission mode or when the transmission mode is the multiple-TB transmission mode without HARQ-ACK spatial bundling, determining that $C_i$=Q, where Q represents the quantity of TBs; or when the transmission mode is a single-TB transmission mode or the transmission mode is the multiple-TB transmission mode with HARQ-ACK spatial bundling, determining that $C_i$=1; or when CBG-based transmission has been configured, one TB is divided into P CBGs, and the transmission mode is the multiple-TB transmission mode or the transmission mode is the multiple-TB transmission mode without HARQ-ACK spatial bundling, determining that $C_i$=Q×P; or when the transmission mode is the single-TB transmission mode or the transmission mode is the multiple-TB transmission mode with the HARQ-ACK spatial bundling, determining that $C_i=P$.

The HARQ-ACK spatial bundling may refer to a logical "and" operation on the HARQ-ACK feedback information corresponding to a plurality of TBs in the same downlink transmission to acquire combined HARQ-ACK feedback information having one bit.

In the embodiments of the present disclosure, when $C_i$ has a same value, i.e., C, the determining $C_i$ may include: when the transmission mode is the multiple-TB transmission mode or when the transmission mode is the multiple-TB transmission mode without HARQ-ACK spatial bundling, determining that C=Q, where Q represents the quantity of the TBs; or when the transmission mode is the single-TB transmission mode or the transmission mode is the multiple-TB transmission mode with HARQ-ACK spatial bundling, determining that C=1; or when the CBG-based transmission has been configured, one TB is divided into P CBGs, and the transmission mode is the multiple-TB transmission mode or the transmission mode is the multiple-TB transmission mode without HARQ-ACK spatial bundling, determining that C=Q×P; or when the transmission mode is the single-TB transmission mode or the transmission mode is the multiple-TB transmission mode with the HARQ-ACK spatial bundling, determining that C=P.

In a possible embodiment of the present disclosure, the determining the quantity of the HARQ-ACK bits based on the quantity of the downlink time points when the HARQ-ACK needs to be fed back at the current uplink time, the quantity of the HARQ-ACK bits corresponding to each downlink time point, and the quantity of the configured or activated serving cells and/or carriers and/or BWPs may include: when M represents the quantity of the downlink time points when the HARQ-ACK is fed back at the current uplink time point, A represents the quantity of the HARQ-ACK bits corresponding to each downlink time point, and N represents the quantity of the configured or activated serving cells and/or carriers and/or BWPs, determining the quantity of the bits the HARQ-ACK using the following equation: X=M*A*N, where X represents the quantity of the bits of the HARQ-ACK, M≥1 and N≥1; or $$X = \sum_{i=0}^{N-1} M_i \times A_i,$$

where X represents the quantity of the bits of the HARQ-ACK, M≥1, N≥1, $M_i$ represents a corresponding value of M on each configured or activated serving cell and/or carrier and/or BWP i, and $A_i$ represents a corresponding value of A on each configured or activated serving cell and/or carrier and/or BWP i.

The configuration information on each configured or activated serving cell and/or carrier and/or BWP, e.g., the configuration information about the transmission mode (the quantity of the TBs), whether there is the spatial bundling, whether the CBG-based transmission has been configured, the quantity of the CBGs configured during the CBG-based transmission, and the quantity of the downlink time points when the HARQ-ACK is fed back at the same uplink time point, may be different, so M and/or A corresponding to different serving cells and/or carriers and/or BWPs may have different values. When A and M each has a same value with respect to each serving cell and/or carrier and/or BWP, the equation X=M*A*N may be adopted, and when A and M each has different values, the equation $$X = \sum_{i=0}^{N-1} M_i \times A_i$$

may be adopted. Of course, when A has the same value and M has different values, the equation $$X = A \times \sum_{i=0}^{N-1} M_i$$

may be adopted, or when M has the same value and A has different values, the equation $$X = M \times \sum_{i=0}^{N-1} A_i$$

may be adopted.

In the embodiments of the present disclosure, the generating the HARQ-ACK sequence corresponding to the quantity of the bits may include: generating the HARQ-ACK sequence having A bits with respect to each downlink time point; and acquiring the HARQ-ACK sequence corresponding to the quantity of the bits based on the HARQ-ACK sequence having A bits with respect to each downlink time point.

In a possible embodiment of the present disclosure, the generating the HARQ-ACK sequence having A bits with respect to each downlink time point may include: generating an NACK and/or DTX as feedback information at a position in the HARQ-ACK sequence having A bits where no downlink transmission has been received; and/or ordering the HARQ-ACKs for the downlink transmission using beams in different beam groups based on a pre-agreed or pre-configured order of the beam groups.

In a possible embodiment of the present disclosure, when the generating the HARQ-ACK sequence having A bits with respect to each downlink time point includes ordering the HARQ-ACKs for the downlink transmission using the beams in different beam groups based on the pre-agreed or pre-configured order of the beam groups, the ordering the HARQ-ACKs for the downlink transmission using the beams in different beam groups based on the pre-agreed or pre-configured order of the beam groups may include ordering the HARQ-ACKs for the downlink transmission using the beams in different beam groups and received at a same downlink time point in the HARQ-ACK sequences corresponding to the downlink time point based on a descending order or an ascending order of numbers of the beam groups.

Considering that M may be greater than 1, the acquiring the HARQ-ACK sequence corresponding to the quantity of the bits based on the HARQ-ACK sequence having A bits corresponding to each downlink time point may include: when the HARQ-ACK needs to be fed back at the same uplink time point for the downlink transmission at a plurality of downlink time points, cascading the HARQ-ACK sequences having A bits corresponding to the downlink time points based on transmission times or based on values of a DAI counter corresponding to the downlink transmission, so as to acquire the HARQ-ACK sequence corresponding to the quantity of the bits; and/or generating the NACK and/or DTX having A bits as the feedback information at a downlink time point where no downlink transmission has been received or a packet loss has been determined; and/or when there is no PDSCH corresponding to a PDCCH at one downlink time point, mapping the HARQ-ACK corresponding to the PDSCH to a predetermined position in the HARQ-ACK sequence corresponding to the quantity of the bits.

Considering that N may be greater than 1, the acquiring the HARQ-ACK sequence corresponding to the quantity of the bits based on the HARQ-ACK sequence having A bits corresponding to each downlink time point may include: when the quantity N of the configured or activated serving cells and/or carriers and/or BWPs is greater than 1, acquiring the HARQ-ACK sequence corresponding to each configured or activated serving cell and/or carrier and/or BWP based on the HARQ-ACK sequence having A bits corresponding to each downlink time point (the specific step may refer to that mentioned hereinabove), and cascading the HARQ-ACK sequences corresponding to the configured or activated serving cells and/or carriers and/or BWPs based on a predetermined order to acquire the HARQ-ACK sequence corresponding to the quantity of the bits; and/or generating the NACK and/or DTX for the quantity of the HARQ-ACK bits corresponding to each serving cell and/or carrier and/or BWP where no downlink transmission has been received or where a packet loss has been determined as the feedback information.

In a possible embodiment of the present disclosure, the downlink transmission may be one or more of the PDSCH, a PDCCH for scheduling the PDSCH, and a PDCCH indicating the release of an SPS resource.

In a possible embodiment of the present disclosure, the generating the HARQ-ACK sequence corresponding to the quantity of the bits and transmitting the HARQ-ACK sequence to the base station may include generating the HARQ-ACK sequence corresponding to the quantity of the bits and transmitting the HARQ-ACK sequence to the base station through a PUCCH and/or a PUSCH.

In the embodiments of the present disclosure, each beam in the beam group is represented by any one of a QCL relationship, a resource and/or a port for a reference signal related to beam measurement, a beam index, and a BPL.

In a word, according to the embodiments of the present disclosure, it is able to solve the problem in the related art where it is impossible to accurately perform the ACK and/or NACK feedback on a plurality of PDSCHs received simultaneously in a same serving cell.

Figure 2:
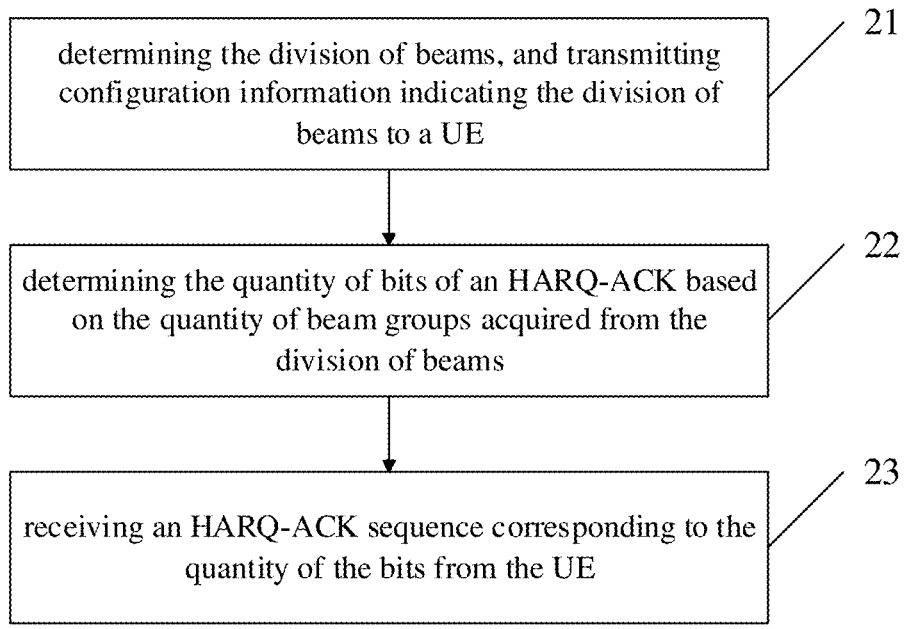
FIG. 2 is a flow chart of a feedback information transmission method according to one embodiment of the present disclosure.

The present disclosure further provides in some embodiments a feedback information transmission method applied for a base station which, as shown in FIG. 2, includes: Step 21 of determining the division of beams, and transmitting configuration information indicating the division of beams to a UE; Step 22 of determining the quantity of bits of an HARQ-ACK based on the quantity of beam groups acquired from the division of beams; and Step 23 of receiving an HARQ-ACK sequence corresponding to the quantity of the bits from the UE.

The HARQ-ACK is just feedback information for the downlink transmission, and it may include ACK or NACK, and may further include DTX. When the downlink transmission has been received accurately, the HARQ-ACK may be the ACK, and when the downlink transmission has not been received accurately or has been lost, the HARQ-ACK may be the NACK or DTX.

According to the feedback information transmission method in the embodiments of the present disclosure, the division of the beams may be determined, and the configuration information indicating the division of beams may be transmitted to the UE. Next, the quantity of the bits of the HARQ-ACK may be determined based on the quantity of beam groups acquired from the division of beams. Then, the HARQ-ACK sequence corresponding to the quantity of the bits may be received from the UE. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently, thereby to solve the problem in the related art where it is impossible to accurately perform the ACK and/or NACK feedback on a plurality of PDSCHs received simultaneously in a same serving cell.

The determining the quantity of the bits of the HARQ-ACK based on the quantity of the beam groups acquired from the division of beams may include: determining the quantity of HARQ-ACK bits corresponding to each downlink time point based on the quantity of the beam groups when the HARQ-ACK needs to be fed back at a current uplink time point; and determining the quantity of the bits of the HARQ-ACK based on the quantity of downlink time points when the HARQ-ACK needs to be fed back at the current time point, the quantity of the HARQ-ACK bits corresponding to each downlink time point, and the quantity of configured or activated serving cells and/or carriers and/or BWPs.

In a possible embodiment of the present disclosure, the determining the quantity of the HARQ-ACK bits corresponding to each downlink time point which requires HARQ-ACK feedback at a current uplink time point, based on the quantity of the beam groups may include determining $$A = \sum_{i=0}^{K-1} C_i,$$

where A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission when a beam in a beam group i is adopted.

It should be appreciated that, possibly different quantities of the beam groups may correspond to different downlink transmission modes, whether there is the HARQ-ACK spatial bundling, and different quantities of CBGs, so the determined $C_i$ may have different values. When $C_i$ has a same value, the above equation may be simplified as A=C*K, where K represents the quantity of the beam groups, and C represents the quantity of the HARQ-ACK bits corresponding to each downlink transmission.

In a possible embodiment of the present disclosure, the determining $C_i$ corresponding to each downlink transmission when the beam in the beam group i is adopted may include: when a transmission mode is a multiple-TB transmission mode or when the transmission mode is the multiple-TB transmission mode without HARQ-ACK spatial bundling, determining that $C_i$=Q, where Q represents the quantity of TBs; or when the transmission mode is a single-TB transmission mode or the transmission mode is the multiple-TB transmission mode with HARQ-ACK spatial bundling, determining that $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, determining that $C_i=Q \times P$; or when the transmission mode is the single-TB transmission mode or the transmission mode is the multiple-TB transmission mode with the HARQ-ACK spatial bundling, determining that $C_i=P$.

The HARQ-ACK spatial bundling may refer to a logical "and" operation on the HARQ-ACK feedback information corresponding to a plurality of TBs in the same downlink transmission to acquire combined HARQ-ACK feedback information having one bit.

In the embodiments of the present disclosure, when $C_i$ has a same value, i.e., C, the determining $C_i$ may include: when the transmission mode is the multiple-TB transmission mode or when the transmission mode is the multiple-TB transmission mode without HARQ-ACK spatial bundling, determining that C=Q, where Q represents the quantity of the TBs; or when the transmission mode is the single-TB transmission mode or the transmission mode is the multiple-TB transmission mode with HARQ-ACK spatial bundling, determining that C=1; or when the CBG-based transmission has been configured, one TB is divided into P CBGs, and the transmission mode is the multiple-TB transmission mode or the transmission mode is the multiple-TB transmission mode without HARQ-ACK spatial bundling, determining that C=Q×P; or when the transmission mode is the single-TB transmission mode or the transmission mode is the multiple-TB transmission mode with the HARQ-ACK spatial bundling, determining that C=P.

In a possible embodiment of the present disclosure, the determining the quantity of the HARQ-ACK bits based on the quantity of the downlink time points when the HARQ-ACK needs to be fed back at the current uplink time, the quantity of the HARQ-ACK bits corresponding to each downlink time point, and the quantity of the configured or activated serving cells and/or carriers and/or BWPs may include determining the quantity of the HARQ-ACK using the equation X=M*A*N or $$X = \sum_{i=0}^{N-1} M_i \times A_i,$$

where X represents the quantity of the bits of the HARQ-ACK, M represents the quantity of the downlink time points when the HARQ-ACK is fed back at the current uplink time point, A represents the quantity of the HARQ-ACK bits corresponding to each downlink time point, N represents the quantity of the configured or activated serving cells and/or carriers and/or BWPs, M≥1, N≥1, $M_i$ represents a corresponding value of M on each configured or activated serving cell and/or carrier and/or BWP i, and $A_i$ represents a corresponding value of A on each configured or activated serving cell and/or carrier and/or BWP i.

The configuration information on each configured or activated serving cell and/or carrier and/or BWP, e.g., the configuration information about the transmission mode (the quantity of the TBs), whether there is the spatial bundling, whether the CBG-based transmission has been configured, the quantity of the CBGs configured during the CBG-based transmission, and the quantity of the downlink time points when the HARQ-ACK is fed back at the same uplink time point, may be different, so M and/or A corresponding to different serving cells and/or carriers and/or BWPs may have different values. When A and M each has a same value with respect to each serving cell and/or carrier and/or BWP, the equation X=M*A*N may be adopted, and when A and M each has different values, the equation $$X = \sum_{i=0}^{N-1} M_i \times A_i$$

may be adopted. Of course, when A has the same value and M has different values, the equation $$X = A \times \sum_{i=0}^{N-1} M_i$$

may be adopted, or when M has the same value and A has different values, the equation $$X = M \times \sum_{i=0}^{N-1} A_i$$

may be adopted.

In a possible embodiment of the present disclosure, the receiving the HARQ-ACK sequence corresponding to the quantity of the bits from the UE may include determining that the HARQ-ACK sequence corresponding to the quantity of the bits is formed by the HARQ-ACK sequence having A bits corresponding to each downlink time point based on a predetermined rule, and acquiring the HARQ-ACK sequence having A bits corresponding to each downlink time point from the HARQ-ACK sequence corresponding to the quantity of the bits based on the predetermined rule.

In a possible embodiment of the present disclosure, the receiving the HARQ-ACK sequence corresponding to the quantity of the bits from the UE may include: determining an NACK and/or DTX generated by the UE at a position in the HARQ-ACK sequence having A bits corresponding to a downlink time point where no downlink transmission has been received as feedback information; and/or determining that the HARQ-ACK having A bits corresponding to each downlink time point is acquired through ordering the HARQ-ACKs for the downlink transmission using beams in different beam groups based on a pre-agreed or pre-configured order of the beam groups, and acquiring the HARQ-ACKs for the downlink transmission using the beams in different beam groups at the downlink time point from the HARQ-ACK sequence having A bits based on a ordering mode.

In a possible embodiment of the present disclosure, when the receiving the HARQ-ACK sequence corresponding to the quantity of the bits from the UE includes determining that the HARQ-ACK having A bits corresponding to each downlink time point is acquired through ordering the HARQ-ACKs for the downlink transmission using the beams in different beam groups based on the pre-agreed or pre-configured order of the beam groups, the determining that the HARQ-ACK having A bits corresponding to each downlink time point is acquired through ordering the HARQ-ACKs for the downlink transmission using the beams in different beam groups based on the pre-agreed or pre-configured order of the beam groups may include ordering the HARQ-ACKs for the downlink transmission using the beams in different beam groups and received at a same downlink time point in the HARQ-ACK sequences corresponding to the downlink time point based on a descending order or an ascending order of numbers of the beam groups.

Considering that M may be greater than 1, the predetermined rule may include: when the HARQ-ACK needs to be fed back at the same uplink time point for the downlink transmission at a plurality of downlink time points, determining that the HARQ-ACK sequence corresponding to the quantity of the bits is acquired through cascading the HARQ-ACK sequences having A bits corresponding to the downlink time points based on transmission times or based on values of a DAI counter corresponding to the downlink transmission; and/or determining that the NACK and/or DTX having A bits generated by the UE for a downlink time point where no downlink transmission has been received or a packet loss has been determined as the feedback information; and/or when there is no PDSCH corresponding to a PDCCH at one downlink time point, determining that the HARQ-ACK corresponding to the PDSCH is mapped to a predetermined position in the HARQ-ACK sequence corresponding to the quantity of the bits.

Considering that N may be greater than 1, the predetermined rule may include: when the quantity N of the configured or activated serving cells and/or carriers and/or BWPs is greater than 1, determining that the HARQ-ACK sequence corresponding to the quantity of the bits is acquired through cascading the HARQ-ACK sequences corresponding to the configured or activated serving cells and/or carriers and/or BWPs based on the HARQ-ACK sequence having A bits corresponding to each downlink time point, cascading the HARQ-ACK sequences corresponding to the configured or activated serving cells and/or carriers and/or BWPs based on a predetermined order, the HARQ-ACK sequence corresponding to each configured or activated serving cell and/or carrier and/or BWP being acquired based on the HARQ-ACK sequence having A bits corresponding to each downlink time point (the specific step is the same as that mentioned hereinabove); and/or determining the NACK and/or DTX for the quantity of the HARQ-ACK bits corresponding to each serving cell and/or carrier and/or BWP where no downlink transmission has been received by the UE or where a packet loss has been determined by the UE as the feedback information.

In a possible embodiment of the present disclosure, the downlink transmission may be one or more of the PDSCH, a PDCCH for scheduling the PDSCH, and a PDCCH indicating the release of an SPS resource.

In a possible embodiment of the present disclosure, the receiving the HARQ-ACK sequence corresponding to the quantity of the bits from the UE may include receiving the HARQ-ACK sequence corresponding to the quantity of the bits from the UE through a PUCCH and/or a PUSCH.

In the embodiments of the present disclosure, each beam in the beam group is represented by any one of a QCL relationship, a resource and/or a port for a reference signal related to beam measurement, a beam index, and a BPL.

In a word, according to the embodiments of the present disclosure, it is able to solve the problem in the related art where it is impossible to accurately perform the ACK and/or NACK feedback on a plurality of PDSCHs received simultaneously in a same serving cell.

The feedback information transmission method will be described hereinafter in combination with the UE and the base station.

In order to solve the problem in the related art, the present disclosure provides in some embodiments a feedback information transmission method, which principally includes grouping, by the base station, the beams and transmitting grouping information to the UE, and determining, by the UE, the quantity of the bits of the HARQ-ACK feedback information based on the quantity of the beam groups. The scheme will be described hereinafter in more details with respect to the UE and the base station.

At a UE side (1) The UE may receive the configuration information, and determine the quantity of the beam groups based on the configuration information.

(2) The UE may determine the quantity of the bits of the HARQ-ACK feedback information based on the quantity of the beam groups.

(3) The UE may generate the HARQ-ACK feedback information sequence corresponding to the quantity of the bits of the determined HARQ-ACK feedback information, and transmit it to the base station.

1. The determining, by the UE, the quantity of the bits of the HARQ-ACK feedback information based on the quantity of the beam groups may include the following steps.

(1): determining the quantity A of the HARQ-ACK bits corresponding to each downlink time point based on the quantity K of the beam groups when the HARQ-ACK needs to be fed back at a current uplink time point.

$$A = \sum_{i=0}^{K-1} C_i,$$

where K represents the quantity of the beam groups, and $C_i$ represents the quantity of the HARQ-ACK bits corresponding to each downlink transmission when a beam in a beam group i is adopted.

For $C_i$, when a transmission mode is a multiple-TB transmission mode or when the transmission mode is the multiple-TB transmission mode without HARQ-ACK spatial bundling, $C_i=Q$, where Q represents the quantity of TBs; or when the transmission mode is a single-TB transmission mode or the transmission mode is the multiple-TB transmission mode with HARQ-ACK spatial bundling, $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, $C_i=Q \times P$; or when the transmission mode is the single-TB transmission mode or the transmission mode is the multiple-TB transmission mode with the HARQ-ACK spatial bundling, $C_i=P$.

(2): determining the quantity of the bits of the HARQ-ACK feedback information based on the quantity M of the downlink time points when the HARQ-ACK needs to be fed back at the current uplink time, the quantity A of the HARQ-ACK bits corresponding to each downlink time point, and the quantity N of configured or activated serving cells and/or carriers and/or BWPs.

The quantity of the bits of the HARQ-ACK feedback information for the UE may be calculated through the equation $X=M*A*N$ or $$X = \sum_{i=0}^{N-1} M_i \times A_i,$$

where $M_i$ represents a corresponding value of M on each configured or activated serving cell and/or carrier and/or BWP i, and $A_i$ represents a corresponding value of A on each configured or activated serving cell and/or carrier and/or BWP i.

M may be equal to 1. At this time, the quantity of the bits of the HARQ-ACK feedback information for the UE may be determined merely based on the quantity A of the bits of the HARQ-ACK corresponding to each downlink time point and the quantity of the configured or activated serving cells and/or carriers and/or BWPs. M may also be greater than 1.

N may be equal to 1. At this time, the quantity A of the bits of the HARQ-ACK feedback information for the UE may be determined merely based on the quantity M of the downlink time points when the HARQ-ACK is fed back at the current uplink time point and the quantity A of the bits of the HARQ-ACK corresponding to each downlink time point. N may also be greater than 1.

2. The generating, by the UE, the HARQ-ACK feedback information sequence corresponding to the quantity of the bits of the determined HARQ-ACK feedback information may include the following steps.

(1): generating the HARQ-ACK feedback information sequence having A bits with respect to each downlink time point.

a. The NACK and/or DTX may be generated as the feedback information at a position in the HARQ-ACK feedback information sequence having A bits corresponding to a downlink time point where no downlink transmission has been received (i.e., when the quantity of the bits of the HARQ-ACK feedback information generated based on the received downlink transmission is smaller than A, it is necessary to supplement the NACK and/or DTX).

b. The plurality of pieces of HARQ-ACK feedback information for the downlink transmission using beams in different beam groups may be ordered based on a pre-agreed or pre-configured order of the beam groups.

To be specific, the plurality of pieces of HARQ-ACK feedback information for the downlink transmission using the beams in different beam groups and received at a same downlink time point may be ordered in the HARQ-ACK sequences corresponding to the downlink time point based on a descending order or an ascending order of numbers of the beam groups. For example, when the plurality of pieces of HARQ-ACK feedback information for the downlink transmission transmitted using the beams in different beam groups have the same quantity of bits, the pieces of HARQ-ACK feedback information having C bits for the downlink transmission received using the beams in a beam group k at the same downlink time point may be ordered at positions C*k−C to C*k−1 in the HARQ-ACK feedback information sequence corresponding to the downlink time point, where a position number starts from 0, k=1, 2, 3, . . . , K, and K represents the quantity of the beam groups. When C=1, C*k−C and C*k−1 represent a same position, i.e., one downlink transmission merely corresponds to the HARQ-ACK having one bit, and merely one position in the HARQ-ACK feedback information sequence corresponding to the downlink time point, i.e., C*k−1, is occupied. For another example, when the plurality of pieces of HARQ-ACK feedback information for the downlink transmission using the beams in different beam groups have different quantities of bits, the pieces of HARQ-ACK feedback information having $C_k$ bits for the downlink transmission received using the beams in the beam group k at the same downlink time point may be ordered at positions $$\sum_{i=1}^{k} C_i - C_k \text{ to } \sum_{i=1}^{k} C_i - 1$$

in the HARQ-ACK feedback information sequence corresponding to the downlink time point, where k=1, 2, 3, . . . , K, K represents the quantity of the beam groups, and $C_i$ represents the quantity of the bits of the HARQ-ACK feedback information corresponding to the downlink transmission using the beams in the beam group i. When $C_k=1$, $$\sum_{i=1}^{k} C_i - C_k \text{ and } \sum_{i=1}^{k} C_i - 1$$

represent a same position, i.e., one downlink transmission merely corresponds to the HARQ-ACK having one bit, and merely one position in the HARQ-ACK feedback information sequence corresponding to the downlink time point, i.e., $$\sum_{i=1}^{k} C_i - 1,$$

is occupied.

(2). When the HARQ-ACK needs to be fed back at the same uplink time point for the downlink transmission at a plurality of downlink time points, cascading the HARQ-ACK feedback information sequences corresponding to the downlink time points based on transmission times or based on values of a DAI counter corresponding to the downlink transmission; and/or generating the NACK and/or DTX having A bits as the feedback information for a downlink time point where no downlink transmission has been received or a packet loss has been determined, where A represents the quantity of the bits of the HARQ-ACK corresponding to one downlink time point determined at least based on the value of K.

(3). When the quantity N of the configured or activated serving cells and/or carriers and/or BWPs is greater than 1, cascading the HARQ-ACK feedback information sequences corresponding to the configured or activated serving cells and/or carriers and/or BWPs based on a predetermined rule, e.g., based on a descending order or an ascending order of the numbers of the serving cells and/or carriers and/or BWPs; and/or generating the BACK and/or DTX for the quantity of the HARQ-ACK bits corresponding to each serving cell and/or carrier and/or BWP where no downlink transmission has been received or where a packet loss has been determined as the feedback information.

The downlink transmission may be one or more of a downlink shared channel, a downlink control channel for scheduling the downlink shared channel, and a downlink control channel indicating the release of an SPS resource. The uplink channel may be an uplink control channel and/or an uplink shared channel.

In the embodiments of the present disclosure, each beam may be represented as any one of the followings.

(1) A QCL relationship. At this time, a configuration of each beam group may be represented as a configuration of a QCL group, and the quantity of the beam groups may be represented as the quantity of the QCL groups, i.e., the quantity of groups acquired after dividing the QCL relationship into groups. It should be appreciated that, an antenna port for a Demodulation Reference Signal (DMRS) for the downlink transmission may be in QCL with oneport on a notified resource for a reference signal related to the beam measurement. For example, resources for a plurality of reference signals or resources+ports may be configured in advance, and in the case of different resources or different resources+ports, results of different transmission combinations (receiving and sending) may be acquired through measurement and/or training and then recorded as a transmission scheme (beam) on the corresponding resource or the corresponding resource+port. When one QCL relationship is notified to the UE, it means that the fact that one DRMS transmitted through a channel is in QCL with a port on the resource for the notified reference signal has been notified to the UE. In other words, it is necessary to perform the transmission (receiving or sending) using the transmission scheme (beam) corresponding to the resource or the resource+port, i.e., using a recorded precoding matrix for the transmission.

(2) A resource and/or port for a reference signal (e.g., a Channel State information Reference Signal (CSI-RS)) related to the beam measurement. At this time, the configuration of the beam group may be represented as a configuration of a group of resources and/or ports for the reference signal, and the quantity of the beam groups may be represented as the quantity of the groups of the resources and/or ports for the reference signal, i.e., the quantity of groups acquired after dividing the resources and/or ports for the reference signal into groups. It should be appreciated that, at this time, all ports on one resource for the reference signal may correspond to one beam; or one port on the resource for the reference signal may correspond to one beam, and different ports may correspond to different beams. For example, resources for a plurality of reference signals or resources+ports may be configured in advance, and in the case of different resources or different resources+ports, results of different transmission combinations (receiving and sending) may be acquired through measurement and/or training and then recorded as a transmission scheme (beam) on the corresponding resource or the corresponding resource+port. When the resource or the resource+port for one reference signal is notified to the UE, it means that the fact that one DRMS transmitted through a channel is in QCL with a port on the resource for the notified reference signal has been notified to the UE. In other words, it is necessary to perform the transmission (receiving or sending) using the transmission scheme (beam) corresponding to the resource or the resource+port, i.e., using a recorded precoding matrix for the transmission.

(3) A beam index. At this time, a configuration of each beam group may be represented as a configuration of a group of beam indices, and the quantity of the beam groups may be represented as the quantity of groups of beam indices, i.e., the quantity of groups acquired after dividing the beam indices into groups. It should be appreciated that, "beam" has been directly defined in the standard, and the QCL relationship corresponding to the beam may be determined based on the beam index. For example, results of different transmission results (e.g., combinations of precoding matrices) may be acquired through measurement and/or training on the configured resources for a plurality of reference signals or on the resources and the corresponding ports and then recorded. The transmission combinations may be directly defined as different beams, or receiving operations in the transmission combinations may be defined as different beams represented by beam indices.

(4) BPL. At this time, the configuration of each beam group may be represented as a configuration of a BPL group, and the quantity of the beam groups may be represented as the quantity of the BPL groups, i.e., the quantity of groups acquired through dividing the BPLs into groups. It should be appreciated that, there may exist a pairing relationship between a beam used by a transmitting end for transmitting one downlink transmission and a beam used by a receiving end for receiving the downlink transmission. Through the BPL, it is able to determine the beam used by the UE for receiving the downlink transmission. It should be further appreciated that, when the downlink transmission, e.g., a PDCCH, a PDSCH or downlink reference information (e.g., CSI-RS), is transmitted by one TRP using one transmission beam, and the downlink transmission is received by the UE using a different reception beam, there may exist a pairing relationship between the transmission beam and the reception beam, and this pairing relationship may be called as BPL. The BPL may be acquired through beam training. For example, results of different transmission combinations (e.g., combinations of precoding matrices) may be acquired through measurement and/or training on the configured resources for a plurality of reference signals or on the resources and the corresponding ports, recorded and then defined as different BPLs.

Detailed description about the beam will be given as follows.

Usually, the base station may configure the beams corresponding to one or more PDCCHs for the UE in advance, so as to facilitate the UE to detect the PDCCHs. The beams may be represented through notifying the UE that there is a QCL relationship between the DMRS ports for the downlink channel and the different CSI-RS configurations (e.g., ports and resources). Based on this QCL relationship, it means that the beam used by the DMRS port for the downlink transmission is the same as the beam corresponding to the corresponding reference signal configuration. When the beams are the same, it means that a same precoding mode is adopted. Hence, when a plurality of QCL relationships have been defined in advance, one or more of the QCL relationships may be directly notified to the UE, and the UE may determine a candidate beam set corresponding to the downlink transmission based on the QCL relationships. Of course, a certain CSI-RS configuration (e.g., a certain resource, or a certain port for a certain resource) may be directly notified to the UE, so as to notify the UE of the beam to be used. The beam may also be represented by the BPL. At this time, a plurality of BPLs may possibly be configured for the UE in advance.

When a BPL index has been notified to the UE, the UE may determine a corresponding BPL based on the BPL index, and determine the beam to be used based on a pair of a transmission beam and a reception beam defined in the BPL. In the above two representation modes, it is unnecessary to define the beam, and instead the beam may be represented implicitly in the other modes. Of course, the beam may also be directly represented through the beam index. At this time, a plurality of beams may be configured or defined for the UE in advance, and the UE may determine the beam to be used based on the beam index. The beam group may be configured based on the representation mode of the beams.

At a base station side (1) The base station may determine the division of beams, and transmit the configuration information indicating the division of beams to the UE.

(2) The base station may determine the quantity of the bits of the HARQ-ACK feedback information based on the quantity of the beam groups. A specific mode for determining the quantity of the bits of the HARQ-ACK feedback information may refer to that for the UE, and thus will not be particularly defined herein.

(3) The base station may receive the HARQ-ACK feedback information sequence corresponding to the determined quantity of the bits of the HARQ-ACK feedback information from the UE.

The base station may be any reception node, e.g., a TRP, a conventional base station, or a relay node.

The scheme in the embodiments of the present disclosure will be described hereinafter illustratively.

It is presumed that six CSI-RS resources have configured (it is presumed that, when there are a plurality of ports for each CSI-RS resource, the ports may be in QCL with each other, i.e., a same precoding matrix (a same beam) may be used; of course, there may exist six CSI-RS resources+ports, e.g., each CSI-RS may be provided with two ports, and six CSI resources+ports may be acquired when three CSI-RS resources have been configured, e.g., a port 1 for a CSI-RS resource 1, a port 2 for the CSI-RS resource 1, a port 1 for a CSI-RS resource 2, a port 2 for the CSI-RS resource 2, a port 1 for a CSI-RS resource 3, and a port 2 for the CSI-RS resource 3). Each CSI-RS resource may correspond to one beam (i.e., one precoding matrix) or one beam group (i.e., one precoding matrix group), e.g., the CSI-RS resource 1 may correspond to a beam 1, the CSI-RS resource 2 may correspond to a beam 2, the CSI-RS resource 3 may correspond to a beam 3, a CSI-RS resource 4 may correspond to a beam 4, a CSI-RS resource 5 may correspond to a beam 5, and a CSI-RS resource 6 may correspond to a beam 6. When a number of one CSI-RS resource has been notified to the UE, it means that a QCL relationship between a DMRS for the downlink transmission and one CSI-RS resource has been implicitly notified to the UE, so that the UE may acquire the beam for the downlink transmission. For example, when the CSI-RS resource 1 has been notified to the UE, it means that the fact that there is the QCL relationship between the DMRS for the downlink transmission and the CSI-RS resource 1 has been notified to the UE, i.e., the UE may use the beam 1 for the downlink transmission. The six CSI-RS resources may be divided into two groups, i.e., a beam group 1 may be {the CSI-RS resource 1, the CSI-RS resource 2 and the CSI-RS resource 3}, and a beam group 2 may be {the CSI-RS resource 4, the CSI-RS resource 5 and the CSI-RS resource 6}. In other words, when K=2, the beam group 1 may include the beams 1, 2 and 3, and the beam group 2 may include the beams 4, 5 and 6. The beam group 1 may correspond to a TRP 1, and the beam group 2 may correspond to a TRP 2. A correspondence between the beam groups (i.e., the beam group 1 and the beam group 2) and the TRPs is unknown to the UE, i.e., information about the correspondence may not be defined in a protocol and it may be implemented by the base station itself. The UE may merely receive the downlink transmission through one of a plurality of beams in one beam group at one downlink time point, but it may receive the downlink transmission through the beams in different beam groups at the same downlink time point.

Case 1: one uplink time point merely corresponds to the HARQ-ACK feedback information at one downlink time point At the base station side At a downlink time point 1, a PDCCH 1 may be transmitted through the beam 1 in the beam group 1 (the beam 1 may be a combination of a transmission beam and a reception beam, or the reception beam for the UE; no matter whether the beam 1 is a combination of beams or the reception beam, it is merely necessary for the UE to determine the reception beam, similarly hereinafter). The PDCCH 1 may be used to schedule a PDSCH 1 that uses one beam in the beam group 1 (the PDSCH 1 may use the beam 1 or any other beam in the beam group 1, e.g., the beam 2, similarly hereinafter). In addition, a PDCCH 2 may be transmitted through the beam 4 in the beam group 2, and the PDCCH 2 may be used to schedule a PDSCH 2 that uses one beam in the beam group 2 (the PDSCH 2 may use the beam 4 or any other beam in the beam group 2, e.g., the beam 5, similarly hereinafter).

At the UE side

At the downlink time point 1, the PDCCH may be detected (a beam set used for the detection of the PDCCH may be a pre-configured subset of the beams in the beam group, e.g., {beam 1, beam 4}, and the beams may be notified through notifying the corresponding CSI-RS resources; or when no subset has been notified, the beam set may be a universal set of the beam group, i.e., {beams 1 to 6}, similarly hereinafter). When each PDSCH corresponds to the HARQ-ACK feedback information having C=1 bit (of course, each PDSCH may correspond to the HARQ-ACK feedback information having more than one bits based on the quantity of the TBs and the quantity of the CBGs, and at this time, a similar processing mode may be adopted), the UE may determine the quantity of the bits of the HARQ-ACK sequence corresponding to the downlink time point 1 is C*K=2 (corresponding to the two beam groups). When the UE has detected the PDCCH 1 using the beam 1 and the PDCCH 2 using the beam 4, the UE may receive the PDSCH 1 and the PDSCH 2 based on scheduling information in the PDCCHs, and generate the HARQ-ACK feedback information for the PDSCH 1 and the PDSCH 2. The beams used for the PDCCH 1 and the PDSCH 1 belong to the beam group 1, and the beams used for the PDCCH 2 and the PDSCH 2 belong to the beam group 2, so it is able to determine, based on the beams used for the PDCCHs and the beams used for the PDSCHs, that the HARQ-ACK having one bit corresponding to the PDSCH 1 is ordered at a first position in the HARQ-ACK sequence corresponding to the downlink time point 1 (i.e., a position where C*k−C=0 when k=1 (starting from 0) corresponds to the beam group 1), and the HARQ-ACK having one bit corresponding to the PDSCH 2 is ordered at a second position in the HARQ-ACK sequence corresponding to the downlink time point 1 (i.e., a position where C*k−C=1 when k=2 (starting from 0) corresponds to the beam group 2). For example, when the PDSCH 1 corresponds to ACK and the PDSCH 2 corresponds to NACK, the HARQ-ACK sequence corresponding to the downlink time point 1 may be {ACK, NACK}.

The UE may transmit two-bit information {ACK, NACK} on the PUCCH and/or the PUSCH at a feedback time point for feeding back the HARQ-ACK corresponding to the downlink time point 1.

At the base station side

The base station may receive the two-bit information {ACK, NACK} on the PUCCH and/or the PUSCH at the feedback time point for feeding back the HARQ-ACK corresponding to the downlink time point 1, and parse the information based on a same ordering process at the UE side (the ordering process may be pre-agreed with the UE). When the first feedback information bit ACK corresponds to the PDSCH 1, it is unnecessary to retransmit the PDSCH 1, and when the second feedback information bit NACK corresponds to the PDSCH 2, it is necessary to retransmit the PDSCH 2.

When a plurality of serving cells has been configured for the UE, the HARQ-ACK sequence corresponding to the downlink time point 1 may be generated in each serving cell based on the above-mentioned process, and the HARQ-ACK sequences corresponding to the downlink time point 1 in the plurality of serving cells may be cascaded based on an order of numbers of the serving cells. The cascaded HARQ-ACK sequence may be transmitted on the PUCCH and/or the PUSCH at the feedback time point for feeding back the HARQ-ACK corresponding to the downlink time point 1. The base station may parse the received HARQ-ACK sequence based on a same cascading order, so as to acquire the HARQ-ACK feedback information corresponding to each serving cell and the PDSCH at the downlink time point in each serving cell.

Case 2: one uplink time point corresponds to the HARQ-ACK information at a plurality of downlink time points At the base station side At the downlink point 1, the PDCCH 1 may be transmitted through the beam 1 in the beam group 1, and the PDCCH 1 may be used to schedule the PDSCH 1 that uses one beam in the beam group 1. In addition, the PDCCH 2 may be transmitted through the beam 4 in the beam group 2, and the PDCCH 2 may be used to schedule the PDSCH 2 that uses one beam in the beam group 2.

At a downlink point 2, a PDCCH 3 may be transmitted through the beam 1 in the beam group 1, and the PDCCH 3 may be used to schedule a PDSCH 3 that uses one beam in the beam group 1. In addition, a PDCCH 4 may be transmitted through the beam 4 in the beam group 2, and the PDCCH 4 may be used to schedule a PDSCH 4 that uses one beam in the beam group 2.

At the UE side

At the downlink time point 1, the PDCCH may be detected. When each PDSCH corresponds to the HARQ-ACK feedback information having C=2 bits (of course, each PDSCH may correspond to the HARQ-ACK feedback information having more than one bit based on the quantity of the TBs and the quantity of the CBGs, and a same processing mode may be adopted), the UE may determine that the quantity of the bits of the HARQ-ACK sequence corresponding to the downlink time point 1 is $C*K=4$ (corresponding to the two beam groups). When the UE has detected the PDCCH 1 using the beam 1 and the PDCCH 2 using the beam 4, the UE may receive the corresponding PDSCH 1 and PDSCH 2 based on the scheduling information in the PDCCHs, and generate the HARQ-ACK feedback information for the PDSCH 1 and the PDSCH 2. The beams used for the PDCCH 1 and the PDSCH 1 belong to the beam group 1, and the beams used for the PDCCH 2 and the PDSCH 2 belong to the beam group 2, so it is able to determine, based on the beams used for the PDCCHs and the beams used for the PDSCHs, that the HARQ-ACKs having two bits corresponding to the PDSCH 1 are ordered at a first position and a second position in the HARQ-ACK sequence corresponding to the downlink time point 1 (i.e., positions where $C*k-C=0$ to $C*k-1=1$ when k=1 (starting from 0) corresponds to the beam group 1), and the HARQ-ACKs having two bits corresponding to the PDSCH 2 are ordered at a third position and a fourth position in the HARQ-ACK sequence corresponding to the downlink time point 1 (i.e., positions where $C*k-C=2$ to $C*k-1=3$ when k=2 (starting from 0) corresponds to the beam group 2). For example, when the PDSCH 1 corresponds to ACK and ACK, and the PDSCH 2 corresponds to NACK and NACK, the HARQ-ACK sequence corresponding to the downlink time point 1 may be {ACK, ACK, NACK, NACK}.

At the downlink time point 2, the PDCCH may be detected. When each PDSCH corresponds to the HARQ-ACK feedback information having C=2 bits (of course, each PDSCH may correspond to the HARQ-ACK feedback information having more than one bit based on the quantity of the TBs and the quantity of the CBGs, and a same processing mode may be adopted), the UE may determine that the quantity of the bits of the HARQ-ACK sequence corresponding to the downlink time point 2 is $C*K=4$ (corresponding to the two beam groups). When the UE has detected the PDCCH 3 using the beam 1 and the PDCCH 4 using the beam 4, the UE may receive the corresponding PDSCH 3 and PDSCH 4 based on the scheduling information in the PDCCHs, and generate the HARQ-ACK feedback information for the PDSCH 3 and the PDSCH 4. The beams used for the PDCCH 3 and the PDSCH 3 belong to the beam group 1, and the beams used for the PDCCH 4 and the PDSCH 4 belong to the beam group 2, so it is able to determine, based on the beams used for the PDCCHs and the beams used for the PDSCHs, that the HARQ-ACKs having two bits corresponding to the PDSCH 3 are ordered at a first position and a second position in the HARQ-ACK sequence corresponding to the downlink time point 2 (i.e., positions where $C*k-C=0$ to $C*k-1=1$ when k=1 (starting from 0) corresponds to the beam group 1), and the HARQ-ACKs having two bits corresponding to the PDSCH 4 are ordered at a third position and a fourth position in the HARQ-ACK sequence corresponding to the downlink time point 2 (i.e., positions where $C*k-C=2$ to $C*k-1=3$ when k=2 (starting from 0) corresponds to the beam group 2). For example, when the PDSCH 3 corresponds to NACK and NACK, and the PDSCH 4 corresponds to ACK and NACK, the HARQ-ACK sequence corresponding to the downlink time point 2 may be {NACK, NACK, ACK, NACK}.

The UE may cascade the HARQ-ACK sequences corresponding to the downlink time point 1 and the downlink time point 2. For example, the HARQ-ACK sequence corresponding to the downlink time point 2 may be located subsequent to the HARQ-ACK sequence corresponding to the downlink time point 1 based on an order of the downlink time points, or the HARQ-ACK sequences may be ordered based on an ascending order or a descending order of values of the DAI counter in the PDCCHs transmitted at the downlink time point 1 and the downlink time point 2, so as to acquire the cascaded HARQ-ACK sequence having 8 bits, i.e., {ACK, ACK, NACK, NACK, NACK, NACK, ACK, NACK}.

The UE may transmit the HARQ-ACK sequence having 8 bits, i.e., {ACK, ACK, NACK, NACK, NACK, NACK, ACK, NACK}, on the PUCCH and/or the PUSCH at a feedback time point for feeding back the HARQ-ACK corresponding to the downlink time point 1 and the downlink time point 2.

At the base station side

At the feedback time point for feeding back the HARQ-ACK corresponding to the downlink time point 1 and the downlink time point 2, the base station may receive the HARQ-ACK sequence having 8 bits, i.e., {ACK, ACK, NACK, NACK, NACK, NACK, ACK, NACK}, and parse the HARQ-ACK sequence based on a same ordering process for the UE. When first and second feedback information bits ACK and ACK correspond to the PDSCH 1 (e.g., the first and second feedback information bits correspond to two TBs of the PDSCH 1 respectively, or when the PDSCH 1 includes one TB and two CBGs, correspond to the two CBGs respectively, similarly hereinafter), it is unnecessary to retransmit the PDSCH1. When third and fourth feedback information bits NACK and NACK correspond to the PDSCH 2, it is necessary to retransmit the PDSCH 2. When fifth and sixth feedback information bits NACK and NACK correspond to the PDSCH 3, it is necessary to retransmit the PDSCH 3. When seventh and eighth feedback information bits ACK and NACK correspond to the PDSCH 4, it is necessary to retransmit a second TB or a second CBG of the PDSCH 4.

When a plurality of serving cells has been configured for the UE, the HARQ-ACK sequence acquired through cascading the HARQ-ACK sequences corresponding to the downlink time point 1 and the downlink time point 2 may be generated in each serving cell based on the above-mentioned process, and the HARQ-ACK sequences corresponding to the plurality of serving cells may be cascaded based on an order of numbers of the serving cells. The cascaded HARQ-ACK sequence may be transmitted on the PUCCH and/or the PUSCH at the feedback time point for feeding back the HARQ-ACK corresponding to the downlink time point 1 and the downlink time point 2. The base station may parse the received HARQ-ACK sequence based on a same cascading order, so as to acquire the HARQ-ACK feedback information corresponding to each serving cell and the PDSCHs at different downlink time points in each serving cell.

The above examples relate to the notification of the beams through configuring the CSI-RS resources. Of course, the beams may also be notified through notifying the beam index, the BPL or the QCL relationship, which will not be particularly defined herein. In addition, the above cases are given by taking one serving cell and/or carrier and/or BWP as an example. When a plurality of serving cells and/or carriers and/or BWPs has been configured to activated, the HARQ-ACK feedback information sequence may be acquired with respect to each serving cell and/or carrier and/or BWP as mentioned hereinabove, and then the HARQ-ACK feedback information sequences corresponding to the plurality of serving cells and/or carriers and/or BWPs may be cascaded.

In a word, the scheme in the embodiments of the present disclosure principally includes determining the quantity of the bits of the HARQ-ACK based on the beam groups, and ordering the HARQ-ACKs based on the beam indices, so it may be applied to the HARQ-ACK feedback information corresponding to the downlink transmission using the beams in different beam groups. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently.

The present disclosure further provides in some embodiments a UE, including a memory, a processor, a transceiver, and a computer program stored in the memory and executed by the processor. The processor is configured to execute the computer program so as to: receive through the transceiver configuration information from a base station, and determine the quantity of beam groups based on the configuration information; determine the quantity of bits of an HARQ-ACK based on the quantity of the beam groups; and generate an HARQ-ACK sequence corresponding to the quantity of the bits and transmit the HARQ-ACK sequence to the base station.

The HARQ-ACK is just feedback information for the downlink transmission, and it may include ACK or NACK, and may further include DTX. When the downlink transmission has been received accurately, the HARQ-ACK may be the ACK, and when the downlink transmission has not been received accurately or has been lost, the HARQ-ACK may be the NACK or DTX.

According to the UE in the embodiments of the present disclosure, the configuration information may be received from the base station, and the quantity of the beam groups may be determined based on the configuration information. Next, the quantity of the bits of the HARQ-ACK may be determined based on the quantity of the beam groups. Then, the HARQ-ACK sequence corresponding to the quantity of the bits may be generated and transmitted to the base station. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently, thereby to solve the problem in the related art where it is impossible to accurately perform the ACK and/or NACK feedback on a plurality of PDSCHs received simultaneously in a same serving cell.

Figure 3:
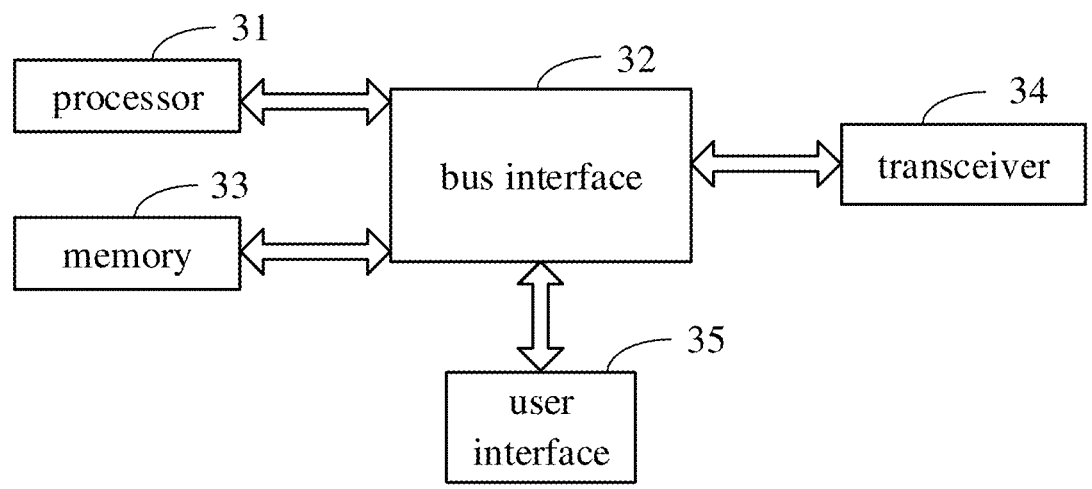
FIG. 3 is a schematic view showing a UE according to one embodiment of the present disclosure.

To be specific, as shown in FIG. 3, the UE may include a processor 31, and a memory 33 connected to the processor 31 via a bus interface 32 and configured to store therein programs and data for the operation of the processor 31. The processor 31 is configured to call and execute the programs and data in the memory 33, so as to: receive through a transceiver 34 configuration information from a base station, and determine the quantity of beam groups based on the configuration information; determine the quantity of bits of an HARQ-ACK based on the quantity of the beam groups; and generate an HARQ-ACK sequence corresponding to the quantity of the bits and transmit the HARQ-ACK sequence to the base station.

The transceiver 31 is connected to the bus interface 32 and configured to receive and transmit data under the control of the processor 31.

It should be appreciated that, in FIG. 3, bus architecture may include a number of buses and bridges connected to each other, so as to connect various circuits for one or more processors 31 and one or more memories 33. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 34 may consist of a plurality of elements, e.g., a transmitter and a receiver for communication with any other devices over a transmission medium. With respect to different UEs, a user interface 35 may also be provided for devices which are to be arranged inside or outside the UE, and these devices may include but not limited to a keypad, a display, a speaker, a microphone and a joystick. The processor 31 may take charge of managing the bus architecture as well general processings. The memory 33 may store data therein for the operation of the processor 31.

It should be further appreciated that, all or parts of the steps may be implemented through hardware, or implemented through relevant hardware indicated by the computer program. The computer program may include instructions for executing all or parts of the steps. In addition, the computer program may be stored in a computer-readable storage medium in any form.

In a possible embodiment of the present disclosure, the processor is further configured to: determine the quantity of HARQ-ACK bits corresponding to each downlink time point based on the quantity of the beam groups when the HARQ-ACK needs to be fed back at a current uplink time point; and determine the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of configured or activated serving cells and/or carriers and/or BWPs.

In a possible embodiment of the present disclosure, the processor is further configured to determine $$A = \sum_{i=0}^{K-1} C_i,$$

where A represents the quantity of the HARQ-ACK bits corresponding to each downlink time point w which requires HARQ-ACK feedback at a current uplink time point, K represents the quantity of the beam groups, and $C_i$ represents the quantity of the HARQ-ACK bits corresponding to each downlink transmission when a beam in a beam group i is adopted.

In a possible embodiment of the present disclosure, when determining $C_i$ corresponding to each downlink transmission when the beam in the beam group i is adopted, the processor is further configured to: when a transmission mode is a multiple-TB transmission mode or when the transmission mode is the multiple-TB transmission mode without HARQ-ACK spatial bundling, determine that $C_i=Q$, where Q represents the quantity of TBs; or when the transmission mode is a single-TB transmission mode or the transmission mode is the multiple-TB transmission mode with HARQ-ACK spatial bundling, determine that $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, determine that $C_i=Q \times P$; or when the transmission mode is the single-TB transmission mode or the transmission mode is the multiple-TB transmission mode with the HARQ-ACK spatial bundling, determine that $C_i=P$.

In the embodiments of the present disclosure, the processor is further configured to, when M represents the quantity of the downlink time points when the HARQ-ACK is fed back at the current uplink time point, A represents quantity the quantity of the HARQ-ACK bits corresponding to each downlink time point, and N represents the quantity of the configured or activated serving cells and/or carriers and/or BWPs, determine the quantity of the HARQ-ACK using the following equation: $X=M*A*N$, where X represents the quantity of the bits of the HARQ-ACK, $M \geq 1$ and $N \geq 1$; or $$X = \sum_{i=0}^{N-1} M_i \times A_i,$$

where X represents the quantity of the bits of the HARQ-ACK, $M \geq 1$, $N \geq 1$, $M_i$ represents a corresponding value of M on each configured or activated serving cell and/or carrier and/or BWP i, and $A_i$ represents a corresponding value of A on each configured or activated serving cell and/or carrier and/or BWP i.

In a possible embodiment of the present disclosure, the processor is further configured to: generate the HARQ-ACK sequence having A bits with respect to each downlink time point; and acquire the HARQ-ACK sequence corresponding to the quantity of the bits based on the HARQ-ACK sequence having A bits with respect to each downlink time point.

In a possible embodiment of the present disclosure, the processor is further configured to: generate an NACK and/or DTX as feedback information at a position in the HARQ-ACK sequence having A bits corresponding to a downlink time point where no downlink transmission has been received; and/or order he HARQ-ACKs for the downlink transmission using beams in different beam groups based on a pre-agreed or pre-configured order of the beam groups.

In a possible embodiment of the present disclosure, when the HARQ-ACKs for the downlink transmission using the beams in different beam groups are ordered based on the pre-agreed or pre-configured order of the beam groups, the processor is further configured to order the HARQ-ACKs for the downlink transmission using the beams in different beam groups and received at a same downlink time point in the HARQ-ACK sequences corresponding to the downlink time point based on a descending order or an ascending order of numbers of the beam groups.

Considering that M may be greater than 1, the processor is further configured to: when the HARQ-ACK needs to be fed back at the same uplink time point for the downlink transmission at a plurality of downlink time points, cascade the HARQ-ACK sequences having A bits corresponding to the downlink time points based on transmission times or based on values of a DAI counter corresponding to the downlink transmission, so as to acquire the HARQ-ACK sequence corresponding to the quantity of the bits; and/or generate the NACK and/or DTX having A bits as the feedback information for a downlink time point where no downlink transmission has been received or a packet loss has been determined; and/or when there is no PDSCH corresponding to a PDCCH at one downlink time point, map the HARQ-ACK corresponding to the PDSCH to a predetermined position in the HARQ-ACK sequence corresponding to the quantity of the bits.

Considering that N may be greater than 1, the processor is further configured to, when the quantity N of the configured or activated serving cells and/or carriers and/or BWPs is greater than 1: acquire the HARQ-ACK sequence corresponding to each configured or activated serving cell and/or carrier and/or BWP based on the HARQ-ACK sequence having A bits corresponding to each downlink time point, and cascade the HARQ-ACK sequences corresponding to the configured or activated serving cells and/or carriers and/or BWPs based on a predetermined order to acquire the HARQ-ACK sequence corresponding to the quantity of the bits; and/or generate the NACK and/or DTX for the quantity of the HARQ-ACK bits corresponding to each serving cell and/or carrier and/or BWP where no downlink transmission has been received or where a packet loss has been determined as the feedback information.

In a possible embodiment of the present disclosure, the downlink transmission is one or more of the PDSCH, a PDCCH for scheduling the PDSCH, and a PDCCH indicating the release of an SPS resource.

In a possible embodiment of the present disclosure, the processor is further configured to generate the HARQ-ACK sequence corresponding to the quantity of the bits and transmit the HARQ-ACK sequence to the base station through a PUCCH and/or a PUSCH.

In a possible embodiment of the present disclosure, each beam in the beam group is represented by any one of a QCL relationship, a resource and/or a port for a reference signal related to beam measurement, a beam index, and a BPL.

The implementation of the UE may refer to that of the feedback information transmission method for the UE mentioned hereinabove, with a same technical effect.

In a word, according to the embodiments of the present disclosure, it is able to solve the problem in the related art where it is impossible to accurately perform the ACK and/or NACK feedback on a plurality of PDSCHs received simultaneously in a same serving cell.

The present disclosure further provides in some embodiments a base station, including a memory, a processor, a transceiver, and a computer program stored in the memory and executed by the processor. The processor is configured to execute the computer program so as to: determine the division of beams, and transmit configuration information indicating the division of beams to a UE; determine the quantity of bits of an HARQ-ACK based on the quantity of beam groups acquired from the division of beams; and receive an HARQ-ACK sequence corresponding to the quantity of the bits from the UE.

The HARQ-ACK is just feedback information for the downlink transmission, and it may include ACK or NACK, and may further include DTX. When the downlink transmission has been received accurately, the HARQ-ACK may be the ACK, and when the downlink transmission has not been received accurately or has been lost, the HARQ-ACK may be the NACK or DTX.

According to the base station in the embodiments of the present disclosure, the division of the beams may be determined, and the configuration information indicating the division of beams may be transmitted to the UE. Next, the quantity of the bits of the HARQ-ACK may be determined based on the quantity of beam groups acquired from the division of beams. Then, the HARQ-ACK sequence corresponding to the quantity of the bits may be received from the UE. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently, thereby to solve the problem in the related art where it is impossible to accurately perform the ACK and/or NACK feedback on a plurality of PDSCHs received simultaneously in a same serving cell.

Figure 4:
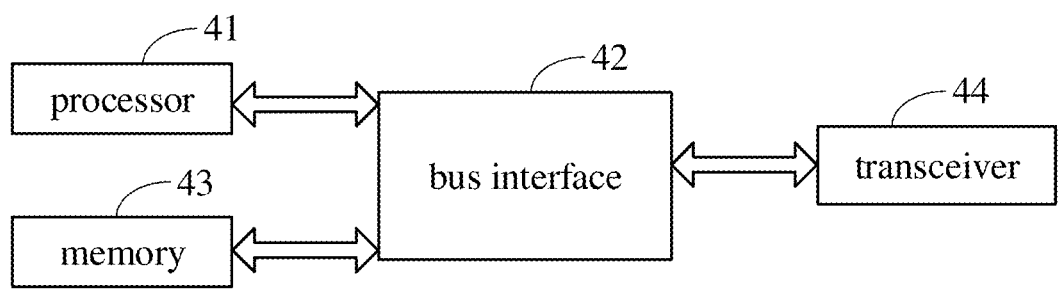
FIG. 4 is a schematic view showing a base station according to one embodiment of the present disclosure.

To be specific, as shown in FIG. 4, the base station may include a processor 41, and a memory 43 connected to the processor 41 via a bus interface 42 and configured to store therein programs and data for the operation of the processor 41. The processor 41 is configured to call and execute the programs and data in the memory 43, so as to: determine the division of beams, and transmit through a transceiver 44 configuration information indicating the division of beams to a UE; determine the quantity of bits of an HARQ-ACK based on the quantity of beam groups acquired from the division of beams; and receive an HARQ-ACK sequence corresponding to the quantity of the bits from the UE.

The transceiver 44 is connected to the bus interface 42 and configured to receive and transmit data under the control of the processor 41.

It should be appreciated that, in FIG. 4, bus architecture may include a number of buses and bridges connected to each other, so as to connect various circuits for one or more processors 41 and one or more memories 43. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 44 may consist of a plurality of elements, e.g., a transmitter and a receiver for communication with any other devices over a transmission medium. The processor 41 may take charge of managing the bus architecture as well general processings. The memory 43 may store data therein for the operation of the processor 41.

It should be further appreciated that, all or parts of the steps may be implemented through hardware, or implemented through relevant hardware indicated by the computer program. The computer program may include instructions for executing all or parts of the steps. In addition, the computer program may be stored in a computer-readable storage medium in any form.

The processor is further configured to: determine the quantity of HARQ-ACK bits corresponding to each downlink time point based on the quantity of the beam groups when the HARQ-ACK needs to be fed back at a current uplink time point; and determine the quantity of the bits of the HARQ-ACK based on the quantity of downlink time points when the HARQ-ACK needs to be fed back at the current time point, the quantity of the HARQ-ACK bits corresponding to each downlink time point, and the quantity of configured or activated serving cells and/or carriers and/or BWPs.

In a possible embodiment of the present disclosure, the processor is further configured to determine $$A = \sum_{i=0}^{K-1} C_i,$$

where A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission when a beam in a beam group i is adopted.

In a possible embodiment of the present disclosure, when determining $C_i$ corresponding to each downlink transmission when the beam in the beam group i is adopted, the processor is further configured to: when a transmission mode is a multiple-TB transmission mode or when the transmission mode is the multiple-TB transmission mode without HARQ-ACK spatial bundling, determine that $C_i$=Q, where Q represents the quantity of TBs; or when the transmission mode is a single-TB transmission mode or the transmission mode is the multiple-TB transmission mode with HARQ-ACK spatial bundling, determine that $C_i$=1; or when CBG-based transmission has been configured, one TB is divided into P CBGs, and the transmission mode is the multiple-TB transmission mode or the transmission mode is the multiple-TB transmission mode without HARQ-ACK spatial bundling, determine that $C_i=Q\times P$; or when the transmission mode is the single-TB transmission mode or the transmission mode is the multiple-TB transmission mode with the HARQ-ACK spatial bundling, determine that $C_i=1$).

The processor is further configured to determine the quantity of the HARQ-ACK using the equation X=M*A*N or $$X = \sum_{i=0}^{N-1} M_i \times A_i,$$

where X represents the quantity of the bits of the HARQ-ACK, M represents the quantity of the downlink time points when the HARQ-ACK is fed back at the current uplink time point, A represents the quantity of the HARQ-ACK bits corresponding to each downlink time point, N represents the quantity of the configured or activated serving cells and/or carriers and/or BWPs, $M\geq 1$, $N\geq 1$, $M_i$ represents a corresponding value of M on each configured or activated serving cell and/or carrier and/or BWP i, and $A_i$ represents a corresponding value of A on each configured or activated serving cell and/or carrier and/or BWP i.

In the embodiments of the present disclosure, the processor is further configured to determine that the HARQ-ACK sequence corresponding to the quantity of the bits is formed by the HARQ-ACK sequence having A bits corresponding to each downlink time point based on a predetermined rule, and acquire the HARQ-ACK sequence having A bits corresponding to each downlink time point from the HARQ-ACK sequence corresponding to the quantity of the bits based on the predetermined rule.

In a possible embodiment of the present disclosure, the processor is further configured to: determine an NACK and/or DTX generated by the UE at a position in the HARQ-ACK sequence having A bits corresponding to a downlink time point where no downlink transmission has been received as feedback information; and/or determine that the HARQ-ACK having A bits corresponding to each downlink time point is acquired through ordering the HARQ-ACKs for the downlink transmission using beams in different beam groups based on a pre-agreed or pre-configured order of the beam groups, and acquire the HARQ-ACKs for the downlink transmission using the beams in different beam groups at the downlink time point from the HARQ-ACK sequence having A bits based on a ordering mode.

In a possible embodiment of the present disclosure, when determining that the HARQ-ACK having A bits corresponding to each downlink time point is acquired through ordering the HARQ-ACKs for the downlink transmission using the beams in different beam groups based on the pre-agreed or pre-configured order of the beam groups, the processor is further configured to order the HARQ-ACKs for the downlink transmission using the beams in different beam groups and received at a same downlink time point in the HARQ-ACK sequences corresponding to the downlink time point based on a descending order or an ascending order of numbers of the beam groups.

Considering that M may be greater than 1, the predetermined rule may include: when the HARQ-ACK needs to be fed back at the same uplink time point for the downlink transmission at a plurality of downlink time points, determining that the HARQ-ACK sequence corresponding to the quantity of the bits is acquired through cascading the HARQ-ACK sequences having A bits corresponding to the downlink time points based on transmission times or based on values of a DAI counter corresponding to the downlink transmission; and/or determining that the NACK and/or DTX having A bits generated by the UE for a downlink time point where no downlink transmission has been received or a packet loss has been determined as the feedback information; and/or when there is no PDSCH corresponding to a PDCCH at one downlink time point, determining that the HARQ-ACK corresponding to the PDSCH is mapped to a predetermined position in the HARQ-ACK sequence corresponding to the quantity of the bits.

Considering that N may be greater than 1, the predetermined rule may include: when the quantity N of the configured or activated serving cells and/or carriers and/or BWPs is greater than 1, determining that the HARQ-ACK sequence corresponding to the quantity of the bits is acquired through cascading the HARQ-ACK sequences corresponding to the configured or activated serving cells and/or carriers and/or BWPs based on the HARQ-ACK sequence having A bits corresponding to each downlink time point, cascading the HARQ-ACK sequences corresponding to the configured or activated serving cells and/or carriers and/or BWPs based on a predetermined order, the HARQ-ACK sequence corresponding to each configured or activated serving cell and/or carrier and/or BWP being acquired based on the HARQ-ACK sequence having A bits corresponding to each downlink time point; and/or determining the NACK and/or DTX for the quantity of the HARQ-ACK bits corresponding to each serving cell and/or carrier and/or BWP where no downlink transmission has been received by the UE or where a packet loss has been determined by the UE as the feedback information.

In a possible embodiment of the present disclosure, the downlink transmission is one or more of the PDSCH, a PDCCH for scheduling the PDSCH, and a PDCCH indicating the release of an SPS resource.

In a possible embodiment of the present disclosure, the processor is further configured to receive the HARQ-ACK sequence corresponding to the quantity of the bits from the UE through a PUCCH and/or a PUSCH.

In the embodiments of the present disclosure, each beam in the beam group is represented by any one of a QCL relationship, a resource and/or a port for a reference signal related to beam measurement, a beam index, and a BPL.

The implementation of the base station may refer to that of the feedback information transmission method for the base station mentioned hereinabove, with a same technical effect.

In a word, according to the embodiments of the present disclosure, it is able to solve the problem in the related art where it is impossible to accurately perform the ACK and/or NACK feedback on a plurality of PDSCHs received simultaneously in a same serving cell.

The present disclosure further provides in some embodiments a computer-readable storage medium storing therein a computer program. The computer program is executed by a processor so as to implement the steps of the feedback information transmission method for the UE.

To be specific, the computer program is executed by the processor, so as to: receive configuration information from a base station, and determine the quantity of beam groups based on the configuration information; determine the quantity of bits of an HARQ-ACK based on the quantity of the beam groups; and generate an HARQ-ACK sequence corresponding to the quantity of the bits and transmit the HARQ-ACK sequence to the base station.

The HARQ-ACK is just feedback information for the downlink transmission, and it may include ACK or NACK, and may further include DTX. When the downlink transmission has been received accurately, the HARQ-ACK may be the ACK, and when the downlink transmission has not been received accurately or has been lost, the HARQ-ACK may be the NACK or DTX.

According to the computer-readable storage medium in the embodiments of the present disclosure, the configuration information may be received from the base station, and the quantity of the beam groups may be determined based on the configuration information. Next, the quantity of the bits of the HARQ-ACK may be determined based on the quantity of the beam groups. Then, the HARQ-ACK sequence corresponding to the quantity of the bits may be generated and transmitted to the base station. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently, thereby to solve the problem in the related art where it is impossible to accurately perform the ACK and/or NACK feedback on a plurality of PDSCHs received simultaneously in a same serving cell.

In a possible embodiment of the present disclosure, the determining the quantity of the bits of the HARQ-ACK based on the quantity of the beam groups may include: determining the quantity of HARQ-ACK bits corresponding to each downlink time point based on the quantity of the beam groups when the HARQ-ACK needs to be fed back at a current uplink time point; and determining the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of configured or activated serving cells and/or carriers and/or BWPs.

In a possible embodiment of the present disclosure, the determining the quantity of the HARQ-ACK bits corresponding to each downlink time point which requires HARQ-ACK feedback at a current uplink time point based on the quantity of the beam groups may include determining $$A = \sum_{i=0}^{K-1} C_i,$$

where A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission when a beam in a beam group i is adopted.

In a possible embodiment of the present disclosure, the determining $C_i$ corresponding to each downlink transmission when the beam in the beam group i is adopted may include: when a transmission mode is a multiple-TB transmission mode or when the transmission mode is the multiple-TB transmission mode without HARQ-ACK spatial bundling, determining that $C_i=Q$, where Q represents the quantity of TBs; or when the transmission mode is a single-TB transmission mode or the transmission mode is the multiple-TB transmission mode with HARQ-ACK spatial bundling, determining that $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, determining that $C_i=Q\times P$; or when the transmission mode is the single-TB transmission mode or the transmission mode is the multiple-TB transmission mode with the HARQ-ACK spatial bundling, determining that $C_i=1$).

In the embodiments of the present disclosure, the determining the quantity of the HARQ-ACK based on the quantity of the downlink time points when the HARQ-ACK needs to be fed back at the current uplink time, the quantity of the HARQ-ACK bits corresponding to each downlink time point, and the quantity of the configured or activated serving cells and/or carriers and/or BWPs may include: when M represents the quantity of the downlink time points when the HARQ-ACK is fed back at the current uplink time point, A represents the quantity of the HARQ-ACK bits corresponding to each downlink time point, and N represents the quantity of the configured or activated serving cells and/or carriers and/or BWPs, determining the quantity of the HARQ-ACK using the following equation: X=M*A*N, where X represents the quantity of the bits of the HARQ-ACK, M≥1 and N≥1; or $$X = \sum_{i=0}^{N-1} M_i \times A_i,$$

where X represents the quantity of the bits of the HARQ-ACK, M≥1, N≥1, $M_i$ represents a corresponding value of M on each configured or activated serving cell and/or carrier and/or BWP i, and $A_i$ represents a corresponding value of A on each configured or activated serving cell and/or carrier and/or BWP i.

The generating the HARQ-ACK sequence corresponding to the quantity of the bits may include: generating the HARQ-ACK sequence having A bits with respect to each downlink time point; and acquiring the HARQ-ACK sequence corresponding to the quantity of the bits based on the HARQ-ACK sequence having A bits with respect to each downlink time point.

In a possible embodiment of the present disclosure, the generating the HARQ-ACK sequence having A bits with respect to each downlink time point may include: generating an NACK and/or DTX as feedback information at a position in the HARQ-ACK sequence having A bits corresponding to a downlink time point where no downlink transmission has been received; and/or ordering the HARQ-ACKs for the downlink transmission using beams in different beam groups based on a pre-agreed or pre-configured order of the beam groups.

In a possible embodiment of the present disclosure, when the generating the HARQ-ACK sequence having A bits with respect to each downlink time point includes ordering the HARQ-ACKs for the downlink transmission using beams in beam groups based on the pre-agreed or pre-configured order of the beam groups, the ordering the HARQ-ACKs for the downlink transmission using the beams in different beam groups based on the pre-agreed or pre-configured order of the beam groups may include ordering the HARQ-ACKs for the downlink transmission using the beams in different beam groups and received at a same downlink time point in the HARQ-ACK sequences corresponding to the downlink time point based on a descending order or an ascending order of numbers of the beam groups.

Considering M may be greater than 1, the acquiring the HARQ-ACK sequence corresponding to the quantity of the bits based on the HARQ-ACK sequence having A bits corresponding to each downlink time point may include: when the HARQ-ACK needs to be fed back at the same uplink time point for the downlink transmission at a plurality of downlink time points, cascading the HARQ-ACK sequences having A bits corresponding to the downlink time points based on transmission times or based on values of a DAI counter corresponding to the downlink transmission, so as to acquire the HARQ-ACK sequence corresponding to the quantity of the bits; and/or generating the NACK and/or DTX having A bits as the feedback information for a downlink time point where no downlink transmission has been received or a packet loss has been determined; and/or when there is no PDSCH corresponding to a PDCCH at one downlink time point, mapping the HARQ-ACK corresponding to the PDSCH to a predetermined position in the HARQ-ACK sequence corresponding to the quantity of the bits.

Considering N may be greater than 1, the acquiring the HARQ-ACK sequence corresponding to the quantity of the bits based on the HARQ-ACK sequence having A bits corresponding to each downlink time point may include: when the quantity N of the configured or activated serving cells and/or carriers and/or BWPs is greater than 1, acquiring the HARQ-ACK sequence corresponding to each configured or activated serving cell and/or carrier and/or BWP based on the HARQ-ACK sequence having A bits corresponding to each downlink time point, and cascading the HARQ-ACK sequences corresponding to the configured or activated serving cells and/or carriers and/or BWPs based on a predetermined order to acquire the HARQ-ACK sequence corresponding to the quantity of the bits; and/or generating the NACK and/or DTX for the quantity of the HARQ-ACK bits corresponding to each serving cell and/or carrier and/or BWP where no downlink transmission has been received or where a packet loss has been determined as the feedback information.

In a possible embodiment of the present disclosure, the downlink transmission may be one or more of the PDSCH, a PDCCH for scheduling the PDSCH, and a PDCCH indicating the release of an SPS resource.

In a possible embodiment of the present disclosure, the generating the HARQ-ACK sequence corresponding to the quantity of the bits and transmitting the HARQ-ACK sequence to the base station may include generating the HARQ-ACK sequence corresponding to the quantity of the bits and transmitting the HARQ-ACK sequence to the base station through a PUCCH and/or a PUSCH.

In the embodiments of the present disclosure, each beam in the beam group may be represented by any one of a QCL relationship, a resource and/or a port for a reference signal related to beam measurement, a beam index, and a BPL.

The implementation of the computer-readable storage medium may refer to that of the feedback information transmission method for the UE mentioned hereinabove, with a same technical effect.

In a word, according to the embodiments of the present disclosure, it is able to solve the problem in the related art where it is impossible to accurately perform the ACK and/or NACK feedback on a plurality of PDSCHs received simultaneously in a same serving cell.

The present disclosure further provides in some embodiments a computer-readable storage medium storing therein a computer program. The computer program is executed by a processor so as to implement the steps of the feedback information transmission method for the base station.

To be specific, the computer program is executed by the processor, so as to: determine the division of beams, and transmit configuration information indicating the division of beams to a UE; determine the quantity of bits of an HARQ-ACK based on the quantity of beam groups acquired from the division of beams; and receive an HARQ-ACK sequence corresponding to the quantity of the bits from the UE.

The HARQ-ACK is just feedback information for the downlink transmission, and it may include ACK or NACK, and may further include DTX. When the downlink transmission has been received accurately, the HARQ-ACK may be the ACK, and when the downlink transmission has not been received accurately or has been lost, the HARQ-ACK may be the NACK or DTX.

According to the computer-readable storage medium in the embodiments of the present disclosure, the division of the beams may be determined, and the configuration information indicating the division of beams may be transmitted to the UE. Next, the quantity of the bits of the HARQ-ACK may be determined based on the quantity of beam groups acquired from the division of beams. Then, the HARQ-ACK sequence corresponding to the quantity of the bits may be received from the UE. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently, thereby to solve the problem in the related art where it is impossible to accurately perform the ACK and/or NACK feedback on a plurality of PDSCHs received simultaneously in a same serving cell.

In a possible embodiment of the present disclosure, the determining the quantity of the bits of the HARQ-ACK based on the quantity of the beam groups acquired from the division of beams may include: determining the quantity of HARQ-ACK bits corresponding to each downlink time point based on the quantity of the beam groups when the HARQ-ACK needs to be fed back at a current uplink time point; and determining the quantity of the bits of the HARQ-ACK based on the quantity of downlink time points when the HARQ-ACK needs to be fed back at the current time point, the quantity of the HARQ-ACK bits corresponding to each downlink time point, and the quantity of configured or activated serving cells and/or carriers and/or BWPs.

In a possible embodiment of the present disclosure, the determining the quantity of the HARQ-ACK bits corresponding to each downlink time point which requires HARQ-ACK feedback at a current uplink time point based on the quantity of the beam groups includes determining $$A = \sum_{i=0}^{K-1} C_i,$$

where A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission when a beam in a beam group i is adopted.

In a possible embodiment of the present disclosure, the determining $C_i$ corresponding to each downlink transmission when the beam in the beam group i is adopted may include: when a transmission mode is a multiple-TB transmission mode or when the transmission mode is the multiple-TB transmission mode without HARQ-ACK spatial bundling, determining that $C_i=Q$, where Q represents the quantity of TBs; or when the transmission mode is a single-TB transmission mode or the transmission mode is the multiple-TB transmission mode with HARQ-ACK spatial bundling, determining that $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, determining that $C_i=Q\times P$; or when the transmission mode is the single-TB transmission mode or the transmission mode is the multiple-TB transmission mode with the HARQ-ACK spatial bundling, determining that $C_i=1$).

The determining the quantity of the HARQ-ACK based on the quantity of the downlink time points when the HARQ-ACK needs to be fed back at the current uplink time, the quantity of the HARQ-ACK bits corresponding to each downlink time point, and the quantity of the configured or activated serving cells and/or carriers and/or BWPs may include determining the quantity of the HARQ-ACK using the equation X=M*A*N or $$X = \sum_{i=0}^{N-1} M_i \times A_i,$$

where X represents the quantity of the bits of the HARQ-ACK, M represents the quantity of the downlink time points when the HARQ-ACK is fed back at the current uplink time point, A represents the quantity of the HARQ-ACK bits corresponding to each downlink time point, N represents the quantity of the configured or activated serving cells and/or carriers and/or BWPs, M≥1, N≥1, $M_i$ represents a corresponding value of M on each configured or activated serving cell and/or carrier and/or BWP i, and $A_i$ represents a corresponding value of A on each configured or activated serving cell and/or carrier and/or BWP i.

In the embodiments of the present disclosure, the receiving the HARQ-ACK sequence corresponding to the quantity of the bits from the UE may include determining that the HARQ-ACK sequence corresponding to the quantity of the bits is formed by the HARQ-ACK sequence having A bits corresponding to each downlink time point based on a predetermined rule, and acquiring the HARQ-ACK sequence having A bits corresponding to each downlink time point from the HARQ-ACK sequence corresponding to the quantity of the bits based on the predetermined rule.

In a possible embodiment of the present disclosure, the receiving the HARQ-ACK sequence corresponding to the quantity of the bits from the UE may include: determining an NACK and/or DTX generated by the UE at a position in the HARQ-ACK sequence having A bits corresponding to a downlink time point where no downlink transmission has been received as feedback information; and/or determining that the HARQ-ACK having A bits corresponding to each downlink time point is acquired through ordering the HARQ-ACKs for the downlink transmission using beams in different beam groups based on a pre-agreed or pre-configured order of the beam groups, and acquiring the HARQ-ACKs for the downlink transmission using the beams in different beam groups at the downlink time point from the HARQ-ACK sequence having A bits based on a ordering mode.

In a possible embodiment of the present disclosure, when the receiving the HARQ-ACK sequence corresponding to the quantity of the bits from the UE includes determining that the HARQ-ACK having A bits corresponding to each downlink time point is acquired through ordering the HARQ-ACKs for the downlink transmission using the beams in different beam groups based on the pre-agreed or pre-configured order of the beam groups, the determining that the HARQ-ACK having A bits corresponding to each downlink time point is acquired through ordering the HARQ-ACKs for the downlink transmission using the beams in different beam groups based on the pre-agreed or pre-configured order of the beam groups may include ordering the HARQ-ACKs for the downlink transmission using the beams in different beam groups and received at a same downlink time point in the HARQ-ACK sequences corresponding to the downlink time point based on a descending order or an ascending order of numbers of the beam groups.

Considering that M may be greater than 1, the predetermined rule may include: when the HARQ-ACK needs to be fed back at the same uplink time point for the downlink transmission at a plurality of downlink time points, determining that the HARQ-ACK sequence corresponding to the quantity of the bits is acquired through cascading the HARQ-ACK sequences having A bits corresponding to the downlink time points based on transmission times or based on values of a DAI counter corresponding to the downlink transmission; and/or determining that the NACK and/or DTX having A bits generated by the UE for a downlink time point where no downlink transmission has been received or a packet loss has been determined as the feedback information; and/or when there is no PDSCH corresponding to a PDCCH at one downlink time point, determining that the HARQ-ACK corresponding to the PDSCH is mapped to a predetermined position in the HARQ-ACK sequence corresponding to the quantity of the bits.

Considering that N may be greater than 1, the predetermined rule may include: when the quantity N of the configured or activated serving cells and/or carriers and/or BWPs is greater than 1, determining that the HARQ-ACK sequence corresponding to the quantity of the bits is acquired through cascading the HARQ-ACK sequences corresponding to the configured or activated serving cells and/or carriers and/or BWPs based on the HARQ-ACK sequence having A bits corresponding to each downlink time point, cascading the HARQ-ACK sequences corresponding to the configured or activated serving cells and/or carriers and/or BWPs based on a predetermined order, the HARQ-ACK sequence corresponding to each configured or activated serving cell and/or carrier and/or BWP being acquired based on the HARQ-ACK sequence having A bits corresponding to each downlink time point; and/or determining the NACK and/or DTX for the quantity of the HARQ-ACK bits corresponding to each serving cell and/or carrier and/or BWP where no downlink transmission has been received by the UE or where a packet loss has been determined by the UE as the feedback information.

In a possible embodiment of the present disclosure, the downlink transmission is one or more of the PDSCH, a PDCCH for scheduling the PDSCH, and a PDCCH indicating the release of an SPS resource.

In a possible embodiment of the present disclosure, the receiving the HARQ-ACK sequence corresponding to the quantity of the bits from the UE may include receiving the HARQ-ACK sequence corresponding to the quantity of the bits from the UE through a PUCCH and/or a PUSCH.

In the embodiments of the present disclosure, each beam in the beam group may be represented by any one of a QCL relationship, a resource and/or a port for a reference signal related to beam measurement, a beam index, and a BPL.

The implementation of the computer-readable storage medium may refer to that of the feedback information transmission method for the base station mentioned hereinabove, with a same technical effect.

In a word, according to the embodiments of the present disclosure, it is able to solve the problem in the related art where it is impossible to accurately perform the ACK and/or NACK feedback on a plurality of PDSCHs received simultaneously in a same serving cell.

Figure 5:
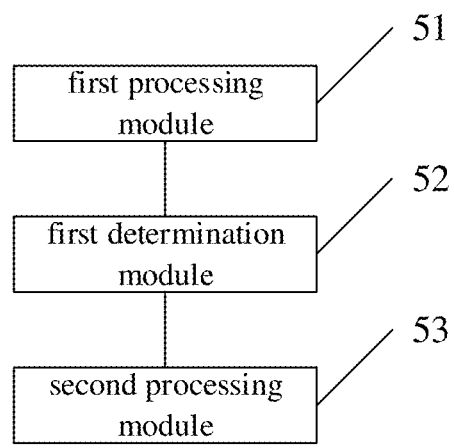
FIG. 5 is a schematic view showing a feedback information transmission device according to one embodiment of the present disclosure.

The present disclosure further provides in some embodiments a feedback information transmission device applied for a UE which, as shown in FIG. 5, includes: a first processing module 51 configured to receive configuration information from a base station, and determine the quantity of beam groups based on the configuration information; a first determination module 52 configured to determine the quantity of bits of an HARQ-ACK based on the quantity of the beam groups; and a second processing module 53 configured to generate an HARQ-ACK sequence corresponding to the quantity of the bits and transmit the HARQ-ACK sequence to the base station.

The HARQ-ACK is just feedback information for the downlink transmission, and it may include ACK or NACK, and may further include DTX. When the downlink transmission has been received accurately, the HARQ-ACK may be the ACK, and when the downlink transmission has not been received accurately or has been lost, the HARQ-ACK may be the NACK or DTX.

According to the feedback information transmission device in the embodiments of the present disclosure, the configuration information may be received from the base station, and the quantity of the beam groups may be determined based on the configuration information. Next, the quantity of the bits of the HARQ-ACK may be determined based on the quantity of the beam groups. Then, the HARQ-ACK sequence corresponding to the quantity of the bits may be generated and transmitted to the base station. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently, thereby to solve the problem in the related art where it is impossible to accurately perform the ACK and/or NACK feedback on a plurality of PDSCHs received simultaneously in a same serving cell.

In a possible embodiment of the present disclosure, the first determination module may include: a first determination sub-module configured to determine the quantity of HARQ-ACK bits corresponding to each downlink time point based on the quantity of the beam groups when the HARQ-ACK needs to be fed back at a current uplink time point; and a second determination sub-module configured to determine the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of configured or activated serving cells and/or carriers and/or BWPs.

In a possible embodiment of the present disclosure, the first determination sub-module may include a first determination unit configured to determine $$A = \sum_{i=0}^{K-1} C_i,$$

where A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission when a beam in a beam group i is adopted.

In a possible embodiment of the present disclosure, the feedback information transmission device may further include a second determination module configured to determine $C_i$ corresponding to each downlink transmission when the beam in the beam group i is adopted. The second determination module may include a first processing sub-module configured to: when a transmission mode is a multiple-TB transmission mode or when the transmission mode is the multiple-TB transmission mode without HARQ-ACK spatial bundling, determine that $C_i=Q$, where Q represents the quantity of TBs; or when the transmission mode is a single-TB transmission mode or the transmission mode is the multiple-TB transmission mode with HARQ-ACK spatial bundling, determine that $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, determine that $C_i=Q \times P$; or when the transmission mode is the single-TB transmission mode or the transmission mode is the multiple-TB transmission mode with the HARQ-ACK spatial bundling, determine that $C_i=P$.

In the embodiments of the present disclosure, the second determination sub-module is further configured to, when M represents the quantity of the downlink time points when the HARQ-ACK is fed back at the current uplink time point, A represents the quantity of the HARQ-ACK bits corresponding to each downlink time point, and N represents the quantity of the configured or activated serving cells and/or carriers and/or BWPs, determine the quantity of the HARQ-ACK using the following equation: $X=M*A*N$, where X represents the quantity of the bits of the HARQ-ACK, $M \geq 1$ and $N \geq 1$; or $$X = \sum_{i=0}^{N-1} M_i \times A_i,$$

where X represents the quantity of the bits of the HARQ-ACK, $M \geq 1$, $N \geq 1$, $M_i$ represents a corresponding value of M on each configured or activated serving cell and/or carrier and/or BWP i, and $A_i$ represents a corresponding value of A on each configured or activated serving cell and/or carrier and/or BWP i.

In a possible embodiment of the present disclosure, the second processing module may include: a first generation sub-module configured to generate the HARQ-ACK sequence having A bits with respect to each downlink time point; and a second processing sub-module configured to acquire the HARQ-ACK sequence corresponding to the quantity of the bits based on the HARQ-ACK sequence having A bits with respect to each downlink time point.

In a possible embodiment of the present disclosure, the first generation sub-module may include a first processing unit configured to: generate an NACK and/or DTX as feedback information at a position in the HARQ-ACK sequence having A bits corresponding to a downlink time point where no downlink transmission has been received; and/or order the HARQ-ACKs for the downlink transmission using beams in different beam groups based on a pre-agreed or pre-configured order of the beam groups.

In a possible embodiment of the present disclosure, when ordering the HARQ-ACKs for the downlink transmission using the beams in different beam groups based on the pre-agreed or pre-configured order of the beam groups, the first processing unit is further configured to order the HARQ-ACKs for the downlink transmission using the beams in different beam groups and received at a same downlink time point in the HARQ-ACK sequences corresponding to the downlink time point based on a descending order or an ascending order of numbers of the beam groups.

Considering that M may be greater than 1, the second processing sub-module may include a second processing unit configured to: when the HARQ-ACK needs to be fed back at the same uplink time point for the downlink transmission at a plurality of downlink time points, cascade the HARQ-ACK sequences having A bits corresponding to the downlink time points based on transmission times or based on values of a DAI counter corresponding to the downlink transmission, so as to acquire the HARQ-ACK sequence corresponding to the quantity of the bits; and/or generate the NACK and/or DTX having A bits as the feedback information for a downlink time point where no downlink transmission has been received or a packet loss has been determined; and/or when there is no PDSCH corresponding to a PDCCH at one downlink time point, map the HARQ-ACK corresponding to the PDSCH to a predetermined position in the HARQ-ACK sequence corresponding to the quantity of the bits.

Considering that N may be greater than 1, the second processing sub-module may include a third processing unit configured to: when the quantity N of the configured or activated serving cells and/or carriers and/or BWPs is greater than 1, acquire the HARQ-ACK sequence corresponding to each configured or activated serving cell and/or carrier and/or BWP based on the HARQ-ACK sequence having A bits corresponding to each downlink time point, and cascade the HARQ-ACK sequences corresponding to the configured or activated serving cells and/or carriers and/or BWPs based on a predetermined order to acquire the HARQ-ACK sequence corresponding to the quantity of the bits; and/or generate the NACK and/or DTX having the quantity of the HARQ-ACK bits corresponding to a serving cell and/or carrier and/or BWP as the feedback information for the serving cell and/or carrier and/or BWP where no downlink transmission has been received or where a packet loss has been determined.

In a possible embodiment of the present disclosure, the downlink transmission is one or more of the PDSCH, a PDCCH for scheduling the PDSCH, and a PDCCH indicating the release of an SPS resource.

In a possible embodiment of the present disclosure, the second processing module may include a third processing sub-module configured to generate the HARQ-ACK sequence corresponding to the quantity of the bits and transmit the HARQ-ACK sequence to the base station through a PUCCH and/or a PUSCH.

In the embodiments of the present disclosure, each beam in the beam group may be represented by any one of a QCL relationship, a resource and/or a port for a reference signal related to beam measurement, a beam index, and a BPL.

The implementation of the feedback information transmission device may refer to that of the feedback information transmission method for the UE mentioned hereinabove, with a same technical effect.

In a word, according to the embodiments of the present disclosure, it is able to solve the problem in the related art where it is impossible to accurately perform the ACK and/or NACK feedback on a plurality of PDSCHs received simultaneously in a same serving cell.

Figure 6:
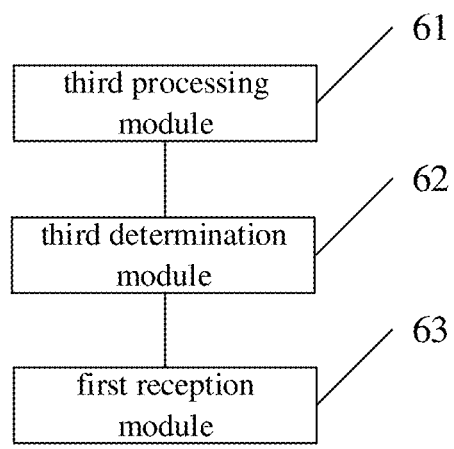
FIG. 6 is a schematic view showing a feedback information transmission device according to one embodiment of the present disclosure.

The present disclosure further provides in some embodiments a feedback information transmission device applied for a base station which, as shown in FIG. 6, includes: a third processing module 61 configured to determine the division of beams, and transmit configuration information indicating the division of beams to a UE; a third determination module 62 configured to determine the quantity of bits of an HARQ-ACK based on the quantity of beam groups acquired from the division of beams; and a first reception module 63 configured to receive an HARQ-ACK sequence corresponding to the quantity of the bits from the UE.

The HARQ-ACK is just feedback information for the downlink transmission, and it may include ACK or NACK, and may further include DTX. When the downlink transmission has been received accurately, the HARQ-ACK may be the ACK, and when the downlink transmission has not been received accurately or has been lost, the HARQ-ACK may be the NACK or DTX.

According to the feedback information transmission device in the embodiments of the present disclosure, the division of the beams may be determined, and the configuration information indicating the division of beams may be transmitted to the UE. Next, the quantity of the bits of the HARQ-ACK may be determined based on the quantity of beam groups acquired from the division of beams. Then, the HARQ-ACK sequence corresponding to the quantity of the bits may be received from the UE. As a result, it is able to ensure the accurate generation of the ACK and/or NACK feedback information when the downlink transmission using different beams is received by the UE simultaneously, and ensure that the ACK and/or NACK feedback information is understood by the UE and the base station consistently, thereby to solve the problem in the related art where it is impossible to accurately perform the ACK and/or NACK feedback on a plurality of PDSCHs received simultaneously in a same serving cell.

In a possible embodiment of the present disclosure, the third determination module may include: a third determination sub-module configured to determine the quantity of HARQ-ACK bits corresponding to each downlink time point based on the quantity of the beam groups when the HARQ-ACK needs to be fed back at a current uplink time point; and a fourth determination sub-module configured to determine the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of configured or activated serving cells and/or carriers and/or BWPs.

In a possible embodiment of the present disclosure, the third determination sub-module may include a second determination unit configured to determine $$A = \sum_{i=0}^{K-1} C_i,$$

where A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission when a beam in a beam group i is adopted.

In a possible embodiment of the present disclosure, the feedback information transmission device may further include a fourth determination module configured to determine $C_i$ corresponding to each downlink transmission when the beam in the beam group i is adopted. The fourth determination module may include a fourth processing sub-module configured to: when a transmission mode is a multiple-TB transmission mode or when the transmission mode is the multiple-TB transmission mode without HARQ-ACK spatial bundling, determine that $C_i=Q$, where Q represents the quantity of TBs; or when the transmission mode is a single-TB transmission mode or the transmission mode is the multiple-TB transmission mode with HARQ-ACK spatial bundling, determine that $C_i=1$; or when CBG-based transmission has been configured, one TB is divided into P CBGs, and the transmission mode is the multiple-TB transmission mode or the transmission mode is the multiple-TB transmission mode without HARQ-ACK spatial bundling, determine that $C_i=Q\times P$; or when the transmission mode is the single-TB transmission mode or the transmission mode is the multiple-TB transmission mode with the HARQ-ACK spatial bundling, determine that $C_i=P$.

In a possible embodiment of the present disclosure, the fourth determination sub-module is configured to determine the quantity of the HARQ-ACK using the equation X=M*A*N or $$X = \sum_{i=0}^{N-1} M_i \times A_i,$$

where X represents the quantity of the bits of the HARQ-ACK, M represents the quantity of the downlink time points when the HARQ-ACK is fed back at the current uplink time point, A represents the quantity of the HARQ-ACK bits corresponding to each downlink time point, N represents the quantity of the configured or activated serving cells and/or carriers and/or BWPs, M≥1, N≥1, $M_i$ represents a corresponding value of M on each configured or activated serving cell and/or carrier and/or BWP i, and $A_i$ represents a corresponding value of A on each configured or activated serving cell and/or carrier and/or BWP i.

In the embodiments of the present disclosure, the first reception module may include a fifth determination sub-module configured to determine that the HARQ-ACK sequence corresponding to the quantity of the bits is formed by the HARQ-ACK sequence having A bits corresponding to each downlink time point based on a predetermined rule, and acquire the HARQ-ACK sequence having A bits corresponding to each downlink time point from the HARQ-ACK sequence corresponding to the quantity of the bits based on the predetermined rule.

In a possible embodiment of the present disclosure, the first reception module may include a sixth determination sub-module configured to: determine an NACK and/or DTX generated by the UE at a position in the HARQ-ACK sequence having A bits corresponding to a downlink time point where no downlink transmission has been received as feedback information; and/or determine that the HARQ-ACK having A bits corresponding to each downlink time point is acquired through ordering the HARQ-ACKs for the downlink transmission using beams in different beam groups based on a pre-agreed or pre-configured order of the beam groups, and acquire the HARQ-ACKs for the downlink transmission using the beams in different beam groups at the downlink time point from the HARQ-ACK sequence having A bits based on a ordering mode.

In a possible embodiment of the present disclosure, when determining that the HARQ-ACK having A bits corresponding to each downlink time point is acquired through ordering the HARQ-ACKs for the downlink transmission using the beams in different beam groups based on the pre-agreed or pre-configured order of the beam groups, the sixth determination sub-module is further configured to order the HARQ-ACKs for the downlink transmission using the beams in different beam groups and received at a same downlink time point in the HARQ-ACK sequences corresponding to the downlink time point based on a descending order or an ascending order of numbers of the beam groups.

Considering that M may be greater than 1, the predetermined rule may include: when the HARQ-ACK needs to be fed back at the same uplink time point for the downlink transmission at a plurality of downlink time points, determining that the HARQ-ACK sequence corresponding to the quantity of the bits is acquired through cascading the HARQ-ACK sequences having A bits corresponding to the downlink time points based on transmission times or based on values of a DAI counter corresponding to the downlink transmission; and/or determining that the NACK and/or DTX having A bits generated by the UE for a downlink time point where no downlink transmission has been received or a packet loss has been determined as the feedback information; and/or when there is no PDSCH corresponding to a PDCCH at one downlink time point, determining that the HARQ-ACK corresponding to the PDSCH is mapped to a predetermined position in the HARQ-ACK sequence corresponding to the quantity of the bits.

Considering that N may be greater than 1, wherein the predetermined rule may include: when the quantity N of the configured or activated serving cells and/or carriers and/or BWPs is greater than 1, determining that the HARQ-ACK sequence corresponding to the quantity of the bits is acquired through cascading the HARQ-ACK sequences corresponding to the configured or activated serving cells and/or carriers and/or BWPs based on the HARQ-ACK sequence having A bits corresponding to each downlink time point, cascading the HARQ-ACK sequences corresponding to the configured or activated serving cells and/or carriers and/or BWPs based on a predetermined order, the HARQ-ACK sequence corresponding to each configured or activated serving cell and/or carrier and/or BWP being acquired based on the HARQ-ACK sequence having A bits corresponding to each downlink time point; and/or determining the NACK and/or DTX for the quantity of the HARQ-ACK bits corresponding to each serving cell and/or carrier and/or BWP where no downlink transmission has been received by the UE or where a packet loss has been determined by the UE as the feedback information.

In a possible embodiment of the present disclosure, the downlink transmission is one or more of the PDSCH, a PDCCH for scheduling the PDSCH, and a PDCCH indicating the release of an SPS resource.

In a possible embodiment of the present disclosure, the first reception module may include a first reception sub-module configured to receive the HARQ-ACK sequence corresponding to the quantity of the bits from the UE through a PUCCH and/or a PUSCH.

In the embodiments of the present disclosure, each beam in the beam group may be represented by any one of a QCL relationship, a resource and/or a port for a reference signal related to beam measurement, a beam index, and a BPL.

The implementation of the feedback information transmission device may refer to that of the feedback information transmission method for the base station mentioned hereinabove, with a same technical effect.

In a word, according to the embodiments of the present disclosure, it is able to solve the problem in the related art where it is impossible to accurately perform the ACK and/or NACK feedback on a plurality of PDSCHs received simultaneously in a same serving cell.

It should be appreciated that, the functional members described in the specification are all referred to as modules/sub-modules/units, so as to emphasize the independence of the implementation thereof in a more particular manner.

In the embodiments of the present disclosure, the modules may be implemented by software, so as to be executed by various processors. For example, an identified, executable code module may include one or more physical or logical blocks including computer instructions, and the module may be constructed as an object, a process or a function. Even so, the executable codes of the identified modules are unnecessary to be physically located together, but may include different instructions stored in different locations. When these instructions are logically combined together, they may form the modules and achieve the prescribed purposes of the modules.

Actually, the executable code module may be a single instruction or a plurality of instructions, and may even be distributed at different code segments, in different programs, or across a plurality of memories. Also, operating data may be identified in the modules, implemented in any appropriate form, and organized in any data structure of an appropriate type. The operating data may be collected as a single data set, or distributed at different locations (including different memories), and may be at least partially present in a system or network merely as an electronic signal.

When the modules are implemented by software, considering the current hardware level, a person skilled in the art may build a corresponding hardware circuit to achieve the corresponding function when not taking the cost into consideration. The hardware circuit includes a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A feedback information transmission method, comprising:
receiving configuration information from a base station, and determining a quantity of beam groups based on the configuration information;
determining a quantity of bits of Hybrid Automatic Repeat Request Acknowledgement (HARQ-ACK) based on the quantity of the beam groups; and
generating an HARQ-ACK sequence corresponding to the quantity of the bits and transmitting the HARQ-ACK sequence to the base station,
wherein the determining the quantity of the bits of the HARQ-ACK based on the quantity of the beam group comprises:
determining a quantity of HARQ-ACK bits corresponding to each downlink time point which requires HARQ-ACK feedback at a current uplink time point, based on the quantity of the beam groups; and
determining the quantity of the bits of the HARQ-ACK based on a quantity of the downlink time points which requires HARQ-ACK feedback at a current uplink time point, the quantity of the HARQ-ACK bits corresponding to each downlink time point, and a quantity of configured or activated serving cells and/or carriers and/or Bandwidth Parts (BWPs).

2. The feedback information transmission method according to claim 1, wherein the determining the quantity of the HARQ-ACK bits corresponding to each downlink time point which requires HARQ-ACK feedback at a current uplink time point, based on the quantity of the beam groups comprises:
determining $$A = \sum_{i=0}^{K-1} C_i,$$

wherein A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission using a beam in a beam group i; and/or
wherein the determining the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of the configured or activated serving cells and/or carriers and/or BWPs comprises:
when M represents the quantity of the downlink time points which requires HARQ-ACK feedback at a current uplink time point, A represents the quantity of the HARQ-ACK bits corresponding to each downlink time point, and N represents the quantity of the configured or activated serving cells and/or carriers and/or BWPs, determining the quantity of the bits of the HARQ-ACK using the following equation:

X=M*A*N, wherein X represents the quantity of the bits of the HARQ-ACK, M≥1 and N≥1; or $$X = \sum_{i=0}^{N-1} M_i \times A_i,$$

wherein X represents the quantity of the bits of the HARQ-ACK, M≥1 and N≥1, $M_1$ represents a corresponding value of M on each configured or activated serving cell and/or carrier and/or BWP i, and $A_i$ represents a corresponding value of A on each configured or activated serving cell and/or carrier and/or BWP i; and/or wherein the generating the HARQ-ACK sequence corresponding to the quantity of the bits comprises:
generating the HARQ-ACK sequence having A bits with respect to each downlink time point; and
acquiring the HARQ-ACK sequence corresponding to the quantity of the bits based on the HARQ-ACK sequence having A bits with respect to each downlink time point.

3. The feedback information transmission method according to claim 2, wherein the determining $C_i$ corresponding to each downlink transmission using the beam in the beam group i comprises:

when a transmission mode is a multiple-TB transmission mode or when the transmission mode is the multiple-TB transmission mode without HARQ-ACK spatial bundling, determining that $C_i$=Q, wherein Q represents the quantity of TBs; or when the transmission mode is a single-TB transmission mode or the transmission mode is the multiple-TB transmission mode with HARQ-ACK spatial bundling, determining that $C_1$=1; or when Code Block Group (CBG)-based transmission has been configured and one TB is divided into P CBGs: if the transmission mode is the multiple-TB transmission mode or the transmission mode is the multiple-TB transmission mode without HARQ-ACK spatial bundling, determining that $C_i$=Q×P, or if the transmission mode is the single-TB transmission mode or the transmission mode is the multiple-TB transmission mode with the HARQ-ACK spatial bundling, determining that $C_i$=P.

4. The feedback information transmission method according to claim 2,
wherein the generating the HARQ-ACK sequence having A bits with respect to each downlink time point comprises at least one of the following method:
method 1: generating a Non-Acknowledgement (NACK) and/or Discontinuous Transmission (DTX) as feedback information at a position in the HARQ-ACK sequence having A bits corresponding to a downlink time point where no downlink transmission has been received;
method 2: ordering the HARQ-ACKs for the downlink transmission using beams in different beam groups based on a pre-agreed or pre-configured order of the beam groups;
and/or
wherein the acquiring the HARQ-ACK sequence corresponding to the quantity of the bits based on the HARQ-ACK sequence having A bits corresponding to each downlink time point comprises at least one of the following methods:

method 3: wherein the acquiring the HARQ-ACK sequence corresponding to the quantity of the bits based on the HARQ-ACK sequence having A bits corresponding to each downlink time point,
when HARQ-ACKs for the downlink transmissions at a plurality of downlink time points needs to be fed back at the same uplink time point, comprises at least one of the following:
cascading the HARQ-ACK sequences having A bits corresponding to the downlink time points based on transmission times or based on values of a Downlink Allocation Index (DAI) counter corresponding to the downlink transmission, so as to acquire the HARQ-ACK sequence corresponding to the quantity of the bits;
generating the NACK and/or DTX having A bits as the feedback information for a downlink time point where no downlink transmission has been received or a packet loss has been determined;
when there is no Physical Downlink Shared Channel (PDSCH) corresponding to a Physical Downlink Control Channel (PDCCH) at one downlink time point, mapping the HARQ-ACK corresponding to the PDSCH to a predetermined position in the HARQ-ACK sequence corresponding to the quantity of the bits,
method 4; wherein the acquiring the HARQ-ACK sequence corresponding to the quantity of the bits based on the HARQ-ACK sequence having A bits corresponding to each downlink time point,
when the quantity N of the configured or activated serving cells and/or carriers and/or BWPs is greater than 1, comprises at least one of the following:
acquiring the HARQ-ACK sequence corresponding to each configured or activated serving cell and/or carrier and/or BWP based on the HARQ-ACK sequence having A bits corresponding to each downlink time point, and cascading the HARQ-ACK sequences corresponding to the configured or activated serving cells and/or carriers and/or BWPs based on a predetermined order to acquire the HARQ-ACK sequence corresponding to the quantity of the bits;
generating the NACK and/or DTX having the quantity of the HARQ-ACK bits corresponding to a serving cell and/or carrier and/or BWP as the feedback information for the serving cell and/or carrier and/or BWP where no downlink transmission has been received or where a packet loss has been determined.

5. The feedback information transmission method according to claim 4, wherein the ordering the HARQ-ACKs for the downlink transmission using the beams in different beam groups based on the pre-agreed or pre-configured order of the beam groups comprises:

ordering the HARQ-ACKs for the downlink transmission using the beams in different beam groups and received at a same downlink time point, in the HARQ-ACK sequences corresponding to the downlink time point, based on a descending order or an ascending order of numbers of the beam groups.

6. A feedback information transmission method, comprising:
- determining a division of beams, and transmitting configuration information indicating the division of beams to a User Equipment (UE);
- determining a quantity of bits of HARQ-ACK based on the quantity of beam groups acquired from the division of beams; and
- receiving an HARQ-ACK sequence corresponding to the quantity of the bits from the UE,
- wherein the determining the quantity of the bits of the HARQ-ACK based on the quantity of the beam groups acquired from the division of beams comprises:
  - determining a quantity of HARQ-ACK bits corresponding to each downlink time point based on the quantity of the beam groups when the HARQ-ACK needs to be fed back at a current uplink time point; and
  - determining the quantity of the bits of the HARQ-ACK based on a quantity of downlink time points when the HARQ-ACK needs to be fed back at the current time point, the quantity of the HARQ-ACK bits corresponding to each downlink time point, and a quantity of configured or activated serving cells and/or carriers and/or Bandwidth Parts (BWPs).

7. The feedback information transmission method according to claim 6, wherein the determining the quantity of the HARQ-ACK bits corresponding to each downlink time point which requires HARQ-ACK feedback at a current uplink time point, based on the quantity of the beam groups comprises:
  - determining $$A = \sum_{i=0}^{K-1} C_i,$$

wherein A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission using a beam in a beam group i; and/or
wherein the determining the quantity of the bits of the HARQ-ACK based on the quantity of the downlink time points when the HARQ-ACK needs to be fed back at the current uplink time, the quantity of the HARQ-ACK bits corresponding to each downlink time point, and the quantity of the configured or activated serving cells and/or carriers and/or BWPs comprises:
  - determining the quantity of the bits of the HARQ-ACK using the equation X=M*A*N or $$X = \sum_{i=0}^{N-1} M_i \times A_i,$$

wherein X represents the quantity of the bits of the HARQ-ACK, M represents the quantity of the downlink time points when the HARQ-ACK is fed back at the current uplink time point, A represents the quantity of the HARQ-ACK bits corresponding to each downlink time point, N represents the quantity of the configured or activated serving cells and/or carriers and/or BWPs, $M \geq 1$, $N \geq 1$, $M_i$ represents a corresponding value of M on each configured or activated serving cell and/or carrier and/or BWP i, and $A_i$ represents a corresponding value of A on each configured or activated serving cell and/or carrier and/or BWP i; and/or
wherein the receiving the HARQ-ACK sequence corresponding to the quantity of the bits from the UE comprises:
  - determining that the HARQ-ACK sequence corresponding to the quantity of the bits is formed by the HARQ-ACK sequence having A bits corresponding to each downlink time point based on a predetermined rule, and acquiring the HARQ-ACK sequence having A bits corresponding to each downlink time point from the HARQ-ACK sequence corresponding to the quantity of the bits based on the predetermined rule.

8. The feedback information transmission method according to claim 7, wherein the determining $C_i$ corresponding to each downlink transmission using the beam in the beam group i comprises:
  - when a transmission mode is a multiple-TB transmission mode or when the transmission mode is the multiple-TB transmission mode without HARQ-ACK spatial bundling, determining that $C_i$=Q, wherein Q represents the quantity of TBs; or when the transmission mode is a single-TB transmission mode or the transmission mode is the multiple-TB transmission mode with HARQ-ACK spatial bundling, determining that $C_i$=1; or
  - when CBG-based transmission has been configured, one TB is divided into P CBGs, and the transmission mode is the multiple-TB transmission mode or the transmission mode is the multiple-TB transmission mode without HARQ-ACK spatial bundling, determining that $C_i$=Q×P; or when the transmission mode is the single-TB transmission mode or the transmission mode is the multiple-TB transmission mode with the HARQ-ACK spatial bundling, determining that $C_i$=P.

9. The feedback information transmission method according to claim 7, wherein the receiving the HARQ-ACK sequence corresponding to the quantity of the bits from the UE comprises at least one of the following methods:
  - method 1: determining an NACK and/or DTX generated by the UE at a position in the HARQ-ACK sequence having A bits where no downlink transmission has been received as feedback information;
  - method 2: determining that the HARQ-ACK having A bits corresponding to each downlink time point is acquired through ordering the HARQ-ACKs for the downlink transmission using beams in different beam groups based on a pre-agreed or pre-configured order of the beam groups, and acquiring the HARQ-ACKs for the downlink transmission using the beams in different beam groups at the downlink time point from the HARQ-ACK sequence having A bits based on a ordering mode,
  - wherein the predetermined rule,
  - when the HARQ-ACK needs to be fed back at the same uplink time point for the downlink transmission at a plurality of downlink time points, comprises at least one of the following:
    - determining that the HARQ-ACK sequence corresponding to the quantity of the bits is acquired through cascading the HARQ-ACK sequences having A bits corresponding to the downlink time points based on transmission times or based on values of a DAI counter corresponding to the downlink transmission;

determining that the NACK and/or DTX having A bits generated by the UE at a downlink time point where no downlink transmission has been received or a packet loss has been determined as the feedback information;

when there is no PDSCH corresponding to a PDCCH at one downlink time point, determining that the HARQ-ACK corresponding to the PDSCH is mapped to a predetermined position in the HARQ-ACK sequence corresponding to the quantity of the bits; or wherein the predetermined rule, when the quantity N of the configured or activated serving cells and/or carriers and/or BWPs is greater than 1, comprises at least one of the following:

determining that the HARQ-ACK sequence corresponding to the quantity of the bits is acquired through cascading the HARQ-ACK sequences corresponding to the configured or activated serving cells and/or carriers and/or BWPs based on the HARQ-ACK sequence having A bits corresponding to each downlink time point, cascading the HARQ-ACK sequences corresponding to the configured or activated serving cells and/or carriers and/or BWPs based on a predetermined order, the HARQ-ACK sequence corresponding to each configured or activated serving cell and/or carrier and/or BWP being acquired based on the HARQ-ACK sequence having A bits corresponding to each downlink time point;

determining the NACK and/or DTX for the quantity of the HARQ-ACK bits corresponding to each serving cell and/or carrier and/or BWP where no downlink transmission has been received by the UE or where a packet loss has been determined by the UE as the feedback information.

10. The feedback information transmission method according to claim 9, wherein the determining that the HARQ-ACK having A bits corresponding to each downlink time point is acquired through ordering the HARQ-ACKs for the downlink transmission using the beams in different beam groups based on the pre-agreed or pre-configured order of the beam groups comprises:

ordering the HARQ-ACKs for the downlink transmission using the beams in different beam groups and received at a same downlink time point in the HARQ-ACK sequences corresponding to the downlink time point based on a descending order or an ascending order of numbers of the beam groups.

11. A base station, comprising a memory, a processor, a transceiver, and a computer program stored in the memory and executed by the processor, wherein the processor is configured to execute the computer program so as to implement the feedback information transmission method according to claim 6.

12. The base station according to claim 11, wherein the processor is further configured to:

determine $$A = \sum_{i=0}^{K-1} C_i,$$

wherein A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission using a beam in a beam group i; and/or the processor is further configured to determine the quantity of the bits of the HARQ-ACK using the equation X=M*A*N or $$X = \sum_{i=0}^{N-1} M_i \times A_i,$$

wherein X represents the quantity of the bits of the HARQ-ACK, M represents the quantity of the downlink time points when the HARQ-ACK is fed back at the current uplink time point, A represents the quantity of the HARQ-ACK bits corresponding to each downlink time point, N represents the quantity of the configured or activated serving cells and/or carriers and/or BWPs, $M \geq 1$, $N \geq 1$, $M_i$ represents a corresponding value of M on each configured or activated serving cell and/or carrier and/or BWP i, and $A_i$ represents a corresponding value of A on each configured or activated serving cell and/or carrier and/or BWP i; and/or the processor is further configured to determine that the HARQ-ACK sequence corresponding to the quantity of the bits is formed by the HARQ-ACK sequence having A bits corresponding to each downlink time point based on a predetermined rule, and acquire the HARQ-ACK sequence having A bits corresponding to each downlink time point from the HARQ-ACK sequence corresponding to the quantity of the bits based on the predetermined rule.

13. The base station according to claim 12, wherein when determining $C_i$ corresponding to each downlink transmission using the beam in the beam group i, the processor is further configured to:

when a transmission mode is a multiple-TB transmission mode or when the transmission mode is the multiple-TB transmission mode without HARQ-ACK spatial bundling, determine that $C_i$=Q, wherein Q represents the quantity of TBs; or when the transmission mode is a single-TB transmission mode or the transmission mode is the multiple-TB transmission mode with HARQ-ACK spatial bundling, determine that $C_i$=1; or when CBG-based transmission has been configured, one TB is divided into P CBGs, and the transmission mode is the multiple-TB transmission mode or the transmission mode is the multiple-TB transmission mode without HARQ-ACK spatial bundling, determine that $C_i$=Q×P; or when the transmission mode is the single-TB transmission mode or the transmission mode is the multiple-TB transmission mode with the HARQ-ACK spatial bundling, determine that $C_i$=P.

14. The base station according to claim 12, wherein the processor is further configured to implement at least one of the following methods:

method 1: determine an NACK and/or DTX generated by the UE at a position in the HARQ-ACK sequence having A bits where no downlink transmission has been received as feedback information;

method 2: determine that the HARQ-ACK having A bits corresponding to each downlink time point is acquired through ordering the HARQ-ACKs for the downlink transmission using beams in different beam groups based on a pre-agreed or pre-configured order of the beam groups, and acquire the HARQ-ACKs for the downlink transmission using the beams in different beam groups at the downlink time point from the HARQ-ACK sequence having A bits based on a ordering mode;

and/or wherein the predetermined rule, when the HARQ-ACK needs to be fed back at the same uplink time point for the downlink transmission at a plurality of downlink time points, comprises at least one of the following:

determining that the HARQ-ACK sequence corresponding to the quantity of the bits is acquired through cascading the HARQ-ACK sequences having A bits corresponding to the downlink time points based on transmission times or based on values of a DAI counter corresponding to the downlink transmission;

determining that the NACK and/or DTX having A bits generated by the UE at a downlink time point where no downlink transmission has been received or a packet loss has been determined as the feedback information;

when there is no PDSCH corresponding to a PDCCH at one downlink time point, determining that the HARQ-ACK corresponding to the PDSCH is mapped to a predetermined position in the HARQ-ACK sequence corresponding to the quantity of the bits;

wherein the predetermined rule, when the quantity N of the configured or activated serving cells and/or carriers and/or BWPs is greater than 1, comprises at least one of the following:

determining that the HARQ-ACK sequence corresponding to the quantity of the bits is acquired through cascading the HARQ-ACK sequences corresponding to the configured or activated serving cells and/or carriers and/or BWPs based on the HARQ-ACK sequence having A bits corresponding to each downlink time point, cascading the HARQ-ACK sequences corresponding to the configured or activated serving cells and/or carriers and/or BWPs based on a predetermined order, the HARQ-ACK sequence corresponding to each configured or activated serving cell and/or carrier and/or BWP being acquired based on the HARQ-ACK sequence having A bits corresponding to each downlink time point;

determining the NACK and/or DTX for the quantity of the HARQ-ACK bits corresponding to each serving cell and/or carrier and/or BWP where no downlink transmission has been received by the UE or where a packet loss has been determined by the UE as the feedback information.

15. The base station according to claim 14, wherein the processor is further configured to order the HARQ-ACKs for the downlink transmission using the beams in different beam groups and received at a same downlink time point in the HARQ-ACK sequences corresponding to the downlink time point based on a descending order or an ascending order of numbers of the beam groups.

16. A UE, comprising a memory, a processor, a transceiver, and a computer program stored in the memory and executed by the processor, wherein the processor is configured to execute the computer program, so as to:

receive through the transceiver configuration information from a base station, and determine a quantity of beam groups based on the configuration information;

determine a quantity of bits of HARQ-ACK based on the quantity of the beam groups; and generate an HARQ-ACK sequence corresponding to the quantity of the bits and transmit the HARQ-ACK sequence to the base station, wherein the processor is further configured to:

determine a quantity of HARQ-ACK bits corresponding to each downlink time point based on the quantity of the beam groups when the HARQ-ACK needs to be fed back at a current uplink time point; and determine the quantity of the bits of the HARQ-ACK based on the quantity of the downlink time points when the HARQ-ACK needs to be fed back at the current uplink time, the quantity of the HARQ-ACK bits corresponding to each downlink time point, and a quantity of configured or activated serving cells and/or carriers and/or Bandwidth Parts (BWPs).

17. The UE according to claim 16, wherein the processor is further configured to:

determine $$A = \sum_{i=0}^{K-1} C_i,$$

wherein A represents the quantity of the HARQ-ACK bits corresponding to each downlink time point which requires HARQ-ACK feedback at a current uplink time point, K represents the quantity of the beam groups, and $C_i$ represents the quantity of the HARQ-ACK bits corresponding to each downlink transmission using a beam in a beam group i;

and/or the processor is further configured to when M represents the quantity of the downlink time points when the HARQ-ACK is fed back at the current uplink time point, A represents the quantity of the HARQ-ACK bits corresponding to each downlink time point, and N represents the quantity of the configured or activated serving cells and/or carriers and/or BWPs, determine the quantity of the bits of the HARQ-ACK using the following equation:

X=M*A*N, wherein X represents the quantity of the bits of the HARQ-ACK, M≥1 and N≥1; or $$X = \sum_{i=0}^{N-1} M_i \times A_i,$$

wherein X represents the quantity of the bits of the HARQ-ACK, M≥1, N≥1, $M_i$ represents a corresponding value of M on each configured or activated serving cell and/or carrier and/or BWP i, and $A_i$ represents a corresponding value of A on each configured or activated serving cell and/or carrier and/or BWP i; and/or the processor is further configured to:

generate the HARQ-ACK sequence having A bits with respect to each downlink time point; and acquire the HARQ-ACK sequence corresponding to the quantity of the bits based on the HARQ-ACK sequence having A bits with respect to each downlink time point.

18. The UE according to claim 17, wherein when determining $C_i$ corresponding to each downlink transmission using the beam in the beam group i, the processor is further configured to:
- when a transmission mode is a multiple-TB transmission mode or when the transmission mode is the multiple-TB transmission mode without HARQ-ACK spatial bundling, determine that $C_i=Q$, wherein Q represents the quantity of TBs; or when the transmission mode is a single-TB transmission mode or the transmission mode is the multiple-TB transmission mode with HARQ-ACK spatial bundling, determine that $C_i=1$; or
- when CBG-based transmission has been configured, one TB is divided into P CBGs, and the transmission mode is the multiple-TB transmission mode or the transmission mode is the multiple-TB transmission mode without HARQ-ACK spatial bundling, determine that $C_i=Q \times P$; or when the transmission mode is the single-TB transmission mode or the transmission mode is the multiple-TB transmission mode with the HARQ-ACK spatial bundling, determine that $C_i=P$.

19. The UE according to claim 17, wherein the processor is further configured to: the processor is further configured to implement at least one of the following methods:
- method 1: generate an NACK and/or DTX as feedback information at a position in the HARQ-ACK sequence having A bits where no downlink transmission has been received;
- method 2: order the HARQ-ACKs for the downlink transmission using beams in different beam groups based on a pre-agreed or pre-configured order of the beam groups;

and/or the processor is further configured to:
- when the HARQ-ACK needs to be fed back at the same uplink time point for the downlink transmission at a plurality of downlink time points, comprise at least one of the following:
  - cascade the HARQ-ACK sequences having A bits corresponding to the downlink time points based on transmission times or based on values of a DAI counter corresponding to the downlink transmission, so as to acquire the HARQ-ACK sequence corresponding to the quantity of the bits;
  - generate the NACK and/or DTX having A bits as the feedback information at a downlink time point where no downlink transmission has been received or a packet loss has been determined;
  - when there is no PDSCH corresponding to a PDCCH at one downlink time point, map the HARQ-ACK corresponding to the PDSCH to a predetermined position in the HARQ-ACK sequence corresponding to the quantity of the bits;

and/or the processor is further configured to, when the quantity N of the configured or activated serving cells and/or carriers and/or BWPs is greater than 1, comprise at least one of the following:
- acquire the HARQ-ACK sequence corresponding to each configured or activated serving cell and/or carrier and/or BWP based on the HARQ-ACK sequence having A bits corresponding to each downlink time point, and cascade the HARQ-ACK sequences corresponding to the configured or activated serving cells and/or carriers and/or BWPs based on a predetermined order to acquire the HARQ-ACK sequence corresponding to the quantity of the bits;
- generate the NACK and/or DTX having the quantity of the HARQ-ACK bits corresponding to a serving cell and/or carrier and/or BWP as the feedback information for the serving cell and/or carrier and/or BWP where no downlink transmission has been received or where a packet loss has been determined.

20. The UE according to claim 19, wherein the processor is further configured to order the HARQ-ACKs for the downlink transmission using the beams in different beam groups and received at a same downlink time point in the HARQ-ACK sequences corresponding to the downlink time point based on a descending order or an ascending order of numbers of the beam groups.

* * * * *